(12) United States Patent
Bernsen et al.

(10) Patent No.: US 12,078,740 B2
(45) Date of Patent: *Sep. 3, 2024

(54) SYSTEM FOR TRUSTED DISTANCE MEASUREMENT

(71) Applicant: KONINKLIJKE PHILIPS N.V., Eindhoven (NL)

(72) Inventors: Johannes Arnoldus Cornelis Bernsen, Eindhoven (NL); Franciscus Antonius Maria Van De Laar, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 568 days.

This patent is subject to a terminal disclaimer.

(21) Appl. No.: 17/431,197

(22) PCT Filed: Feb. 19, 2020

(86) PCT No.: PCT/EP2020/054279
§ 371 (c)(1),
(2) Date: Aug. 16, 2021

(87) PCT Pub. No.: WO2020/169629
PCT Pub. Date: Aug. 27, 2020

(65) Prior Publication Data
US 2022/0146619 A1 May 12, 2022

(30) Foreign Application Priority Data
Feb. 19, 2019 (EP) .................................... 19158090

(51) Int. Cl.
*G01S 5/02* (2010.01)
*G01S 11/08* (2006.01)
(Continued)

(52) U.S. Cl.
CPC .......... *G01S 5/0244* (2020.05); *G01S 5/0236* (2013.01); *G01S 11/08* (2013.01); *H04W 4/023* (2013.01); *H04W 12/63* (2021.01)

(58) Field of Classification Search
USPC ............................................................ 726/4
See application file for complete search history.

(56) References Cited

U.S. PATENT DOCUMENTS 8,762,727 B2 6/2014 Epstein et al.
10,064,057 B2 8/2018 Aldana et al.
(Continued)

FOREIGN PATENT DOCUMENTS

AU 2016222300 B2 * 8/2020 ........... G08G 5/0008
CA 3028302 A1 * 6/2019 ............. G01S 19/04
(Continued)

OTHER PUBLICATIONS

IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), Dec. 2016.
(Continued)

Primary Examiner — Sakinah White Taylor

(57) ABSTRACT

A device is arranged for determining a first distance according to a ranging protocol using a measurement message from a second device. A cooperating device (130) has a directional antenna (133) and is located at a trusted distance (150) sharing a connecting direction (160) with the first device. The cooperating device determines a third direction of the same measurement message, and transfers support data to the first device based on the third direction. The first device first determines a first angle (161) between the first direction and the connecting direction and obtains a third angle (163) between the third direction and the connecting direction (Continued)

using the support data. Then a verification test is performed on the first distance (151), the trusted distance (150), the first and the third angle. The first distance is reliable when said distances and angles correspond to a viable spatial constellation (100) of the devices.

15 Claims, 8 Drawing Sheets

(51) Int. Cl.
*H04W 4/02* (2018.01)
*H04W 12/63* (2021.01)

(56) References Cited

U.S. PATENT DOCUMENTS

| | | | |
|---|---|---|---|
| 2008/0125161 | A1 | 5/2008 | Ergen et al. |
| 2016/0234703 | A1 | 8/2016 | Aldana et al. |
| 2017/0257758 | A1 | 9/2017 | Aldana et al. |
| 2018/0063154 | A1 | 3/2018 | Gullicksen |
| 2019/0120928 | A1* | 4/2019 | O'Shea ............ G01S 5/0236 |

FOREIGN PATENT DOCUMENTS

| | | | | |
|---|---|---|---|---|
| CN | 101133586 | B | * 3/2012 | ......... H04L 63/0823 |
| JP | 2007329537 | A | 12/2007 | |
| JP | 2008017302 | A | 1/2008 | |
| JP | 2008079088 | A | 4/2008 | |
| JP | 2008167440 | A | 7/2008 | |
| JP | 2008236262 | A | 10/2008 | |
| JP | 2010117241 | A | 5/2010 | |

OTHER PUBLICATIONS

Information technology—Telecommunications and information exchange between systems—Local and metropolitan area networks—Part 1AS: Timing and synchronization for timesensitive applications in bridged local area networks, Reference No. ISO/IEC/IEEE 8802-1AS:2014(E).
Martin Schussel, "Angle of Arrival Estimation using WiFi and Smartphones", 2016 International Conference on Indoor Positioning and Indoor Navigation (IPIN), Oct. 4-7, 2016, Alcala de Henares, Spain; http://www3.uah.es/ipin2016/usb/app/descargas/223_WIP.pdf.
Diffie, W.; Hellman, M. (1976), "New directions in cryptography", IEEE Transactions on Information Theory, 22 (6):644-654.
Device Provisioning Protocol—Technical Specification—Version 1.0, Wi-Fi Alliance, 2018, https://www.wi-fi.org/file-member/device-provisioning-protocol-specification.
Neighbor Awareness Networking—Technical Specification—Version 2.0, Wi-Fi Alliance, 2017, https://www.wi-fi.org/file-member/wi-fi-nan-technical specification.
Opportunistic Wireless Encryption—Technical Specification—Version 1.0, Wi-Fi Alliance, 2018, https://www.wi-fi.org/file-member/opportunistic-wireless-encryption-specification 2018.
International Search Report and Written Opinion from PCT/EP2020/054279 mailed Aug. 27, 2020.
Sven Fischer, "Observed Time Difference of Arrival (OTDOA) Positioning in 3GPP LTE", Qualcomm Technologies, Inc., Jun. 6, 2014.
3GPP TS 36.133: "Evolved Universal Terrestrial Radio Access (E-UTRA); Requirements for support of radio resource management". May 2016.
3GPP TS 36.211: "Evolved Universal Terrestrial Radio Access (E-UTRA); Physical Channels and Modulation". Oct. 2018.
3GPP TS 36.214: "Evolved Universal Terrestrial Radio Access (E-UTRA); Physical layer—Measurements". Apr. 2017.
3GPP TS 36.321: "3rd Generation Partnership Project; Technical Specification Group Radio Access Network; Evolved Universal Terrestrial Radio Access (E-UTRA); Medium Access Control (MAC) protocol specification". Sep. 2002.
3GPP TS 36.355: "Evolved Universal Terrestrial Radio Access (E-UTRA); LTE Positioning Protocol (LPP)". Jul. 2017.
3GPP TS 37.571-1: "Universal Terrestrial Radio Access (UTRA) and Evolved Utra (E-Utra) and Evolved Packet Core (EPC); User Equipment (UE) conformance specification for UE positioning; Part 1: Conformance test specification" Nov. 2020.

* cited by examiner

SYSTEM FOR TRUSTED DISTANCE MEASUREMENT

CROSS REFERENCE TO RELATED APPLICATIONS

This application is a U.S. national phase application of International Application No. PCT/EP2020/054279 filed on Feb. 19, 2020, which claims the benefit of EP Application Serial No. 19158090.1 filed on Feb. 19, 2019 and are incorporated herein by reference.

FIELD OF THE INVENTION

The invention relates to a device for distance measurement via wireless communication between the device acting as a first device and a second device for wireless communication, the wireless communication comprising a ranging protocol for determining a distance between the first and the second device based on an arrival time of a measurement message at the first device, the protocol comprising transmitting the measurement message by the second device. The invention further relates to methods for distance measurement and computer program products for use in a device or server.

The present invention relates generally to the field of location systems, and more in particular provides various devices and methods for verifying distance measurements as well as corresponding computer program products.

BACKGROUND OF THE INVENTION

A need for location aware services may exist in indoor areas. For example in large indoor complexes, such as hospitals, universities, parking lots, shopping malls, and/or offices, wireless services may be provided to mobile devices at close distance. An indoor location system may provide a service to consumers (hereafter end-users); a service that end-users will eventually rely on. Such location based services may be provided only to devices that are close by, i.e. at a limited distance to the service providing device. In a further example, an electronic, wireless car door key must be close to the car before it should be able to open the door. A cheating door key may tamper with the distance measurement protocol such that it can open the door when it is much further from the car than it should be.

It is therefore important that the distance measurement is reliable. Reliable in this context means that a responding device provides reliable and correct distance or arrival data as measured, as opposed to distance or arrival time data that has been tampered with or that have been faked to intentionally cause a distance different from the real distance to the responding device.

A known system for distance measurement is recently developed in a version of the protocol for wireless communication defined in IEEE 802.11, see reference document [802.11]. The version comprises a ranging protocol for determining a distance between two devices, and allows for accurate distance measurement and determining location of devices up to 1 meter or even lower resolution. The ranging protocol, called Fine Timing Measurement procedure (FTM), is defined in [802.11] Chapter 10.24.6, and accurately measures arrival times of measurement messages to determine a Round-Trip Time (RTT) of the signal, and derives the distance based on the measured arrival times of the messages in combination with the transmission timing. For example, assuming a wireless signal propagated in free air with substantially the speed of light, it takes 3.3 ns for the radiation to cover a distance of a meter while a Wi-Fi station may be able to reach a time granularity of around 0.1 ns.

Note that this application is in the field of ranging protocols. These may correspond to what is known as time-of-flight measurements which measure the time it takes for the electromagnetic radiation to travel between the transmitter and the receiver. They are fundamentally different than the distance measurement as performed in IP/HTTP protocol, a.k.a. ping times, which measure the time it takes for an IP data packet to transit in a network from a source device to a sink device, wherein such transit may include a number of intermediate devices.

In order for two devices to determine the distance between each other based on arrival time measurements, they need to operate according to a ranging protocol. For example, an initiating wireless device may initiate a request to start a round trip time measurement. A responding device may determine an interval between sending a message and receiving the request, and send the time interval to the initiating device.

However, by sending false data a device can actually claim it is closer or further away than it is in reality. Also, a measurement message may have to be transmitted at a predetermined time, e.g. according to a timing grid. A malicious device may intentionally send the measurement message at a different time. Such malicious behavior could lead to possible abuse of a location based service if an initiating device trusts determined distance/location information to be accurate. For example a location based service may automatically start some transaction.

So, in the known systems the measurements or the received distance data may be tampered with and therefore cannot be fully trusted.

SUMMARY OF THE INVENTION

A first device that measures the distance to a second device using the Time Measurement (TM) or Fine Time Measurement (FTM) methods of 802.11 may try to protect itself against fake time of arrival (TOA) and fake time of departure (TOD) data by malicious devices that in doing so want to appear at a different, especially smaller distance than they really are.

To counter such behavior a distance measurement system may involve a third device, that also performs a distance measurement to determine a second distance between the third device and the second, potentially malicious, device. By comparing both distances and knowing, and trusting, the distance between the first device and the cooperating device, a verification test may be performed on both determined distances. However, although it may be more complicated for the malicious device to tamper with both distance measurements so that they pass the verification test, it may still be possible.

It is an object of the invention to provide a system for making arrival time based distance measurement more trustworthy. For this purpose devices and methods are provided as defined in the appended claims.

According to a first aspect of the invention there is provided a device for distance measurement via wireless communication between the device acting as a first device and a second device for wireless communication, the wireless communication comprising a ranging protocol for determining a distance between the first and the second device based on an arrival time of a measurement message at the first device, the protocol comprising transmitting the measurement message by the second device;
the device comprising
a first transceiver for transmitting and receiving of messages,
a first message processor arranged for
processing the messages according to the ranging protocol;
determining a first arrival time of the measurement message at the first device, and
determining a first distance between the first device and the second device based on the first arrival time;
wherein
the first transceiver comprises a first directional antenna for detecting a direction of a received signal carrying a message, and
the first message processor is arranged for communicating with a third device, the third device acting as a cooperating device being located at a trusted distance from the first device, the cooperating device sharing a connecting direction with the first device, the connecting direction being indicative of a direction of a line connecting the first device and the cooperating device;
the third device comprising
a wireless receiver for receiving of messages, the receiver comprising a third directional antenna for detecting a direction of a received signal carrying a message,
a third message processor arranged for
determining a third direction when receiving the measurement message at the third device,
transferring support data to the first device, the support data being indicative of the third direction;
the first message processor being arranged, for assessing the determined distance,
determining a first direction when receiving the measurement message at the first device,
determining a first angle between the first direction and the connecting direction,
receiving the support data from the cooperating device,
obtaining a third angle between the third direction and the connecting direction based on the support data,
performing a verification test on the first distance, the trusted distance, the first angle and the third angle, the verification test accepting the first distance as reliable when said distances and angles correspond to a viable spatial constellation of the first device, the second device and the cooperating device.

According to a further aspect there is provided a method for distance measurement via wireless communication between a first device and a second device, the wireless communication comprising a ranging protocol for determining a distance between the first and the second device based on an arrival time of a measurement message at the first device, the protocol comprising transmitting the measurement message by the second device; the first device comprising a first directional antenna for detecting a direction of a received signal carrying a message;
the method comprising
obtaining a first distance between the first device and the second device based on a first arrival time of the measurement message at the first device,
communicating with a third device, the third device acting as a cooperating device being located at a trusted distance from the first device, the cooperating device sharing a connecting direction with the first device, the connecting direction being indicative of a direction of a line connecting the first device and the cooperating device;
the third device comprising a third directional antenna for detecting a direction of a received signal carrying a message, and being arranged for
determining a third direction when receiving the measurement message at the third device, and
providing support data, the support data being indicative of the third direction;
the method comprising, for assessing the determined distance,
determining a first direction when receiving the measurement message at the first device,
determining a first angle between the first direction and the connecting direction,
obtaining a third angle between the third direction and the connecting direction based on the support data,
performing a verification test on the first distance, the trusted distance, the first angle and the third angle, the verification test accepting the first distance as reliable when said distances and angles correspond to a viable spatial constellation of the first device, the second device and the cooperating device.

According to a further aspect there is provided a method for acting as a cooperating device in a distance measurement via wireless communication between a first device and a second device, the cooperating device being located at a trusted distance from the first device, the cooperating device sharing a connecting direction with the first device, the connecting direction being indicative of a direction of a line connecting the first device and the cooperating device. The wireless communication comprises a ranging protocol for determining a distance between the first and the second device based on an arrival time of a measurement message at the first device, the protocol comprising transmitting the measurement message by the second device. The first device comprises a first directional antenna for detecting a direction of a received signal carrying a message and the first device being arranged for obtaining a first distance between the first device and the second device based on a first arrival time of the measurement message at the first device. The third device comprises a third directional antenna for detecting a direction of a received signal carrying a message. The method comprises
determining a third direction when receiving the measurement message at the third device, and
providing support data, the support data being indicative of the third direction. The first device being arranged, for assessing the determined distance,
determining a first direction when receiving the measurement message at the first device,
determining a first angle between the first direction and the connecting direction,
obtaining a third angle between the third direction and the connecting direction based on the support data,
performing a verification test on the first distance, the trusted distance, the first angle and the third angle, the verification test accepting the first distance as reliable when said distances and angles correspond to a viable spatial constellation of the first device, the second device and the cooperating device.

The above features have the effect that when the second device participates in a ranging protocol, the first device may determine the distance according to the ranging protocol based on the first arrival time of the measurement message as transmitted by the second device. In addition, the third device determines a third direction when receiving the same measurement message at the third device. The third device is located at a distance from the first device, which distance is known to the first device and trusted to be reliable. Such a distance is called a trusted distance in this document. Also, the cooperating device shares a connecting direction with the first device, which connecting direction is indicative of a direction of a line connecting the first device and the cooperating device. Sharing means that both the first and the third device know this connecting direction as a reference direction which may be used to determine angles is a coordinate system that is available for both devices. The trusted distance and the connecting direction may be predetermined, or may be measured separately or may be entered by a user. Such a third device may be called a cooperating device in this document.

Note that the third device, acting as a cooperating device, does not perform a further distance measurement according to the ranging protocol or separate angle measurement using some further measurement messages. Instead, the third device cooperates to determine said third direction of said same measurement message at the third device, and to transfer support data to the first device, the support data being based on the third direction. For example, the support data may comprise third direction data relative to a reference direction or absolute directional grid, or relative to some other direction determined while receiving a further message also received by the first device. Alternatively or additionally the support data may comprise third angle data, the third device being able to determine a third angle between the between the third direction and the connecting direction.

The first message processor is arranged for determining a first direction when receiving the measurement message at the first device, and determining a first angle between the first direction and the connecting direction. Upon receiving the support data, the processor is enabled to obtain the third angle between the third direction and the connecting direction using the support data. Subsequently, a verification test is performed on the first distance, the trusted distance and the first angle and the third angle. Advantageously, the verification test may accept the first distance as reliable when said distances and angles correspond to a viable spatial constellation of the first device, the second device and the cooperating device.

In an embodiment, the verification test comprises a cosine rule check or a triangle inequality check on the viable spatial constellation. Advantageously, the check proves whether a spatial constellation of a triangle may have the respective angles between the sides.

In an embodiment, the ranging protocol comprises exchanging messages that are cryptographically protected based on key data, and the first message processor is arranged to share the key data with the cooperating device to enable the third message processor to cryptographically process the messages according to the ranging protocol. Advantageously, encrypting messages between the first and the third device protects such messages being tampered with by the, potentially malicious, second device.

In an embodiment, the first message processor is arranged to determine the trusted distance according to the ranging protocol, or the first message processor is arranged to determine the connecting direction using the first directional antenna. Advantageously, preceding the actual measurements to the second device, the trusted distance and/or connecting direction are determined using the same ranging protocol and/or the same directional antenna.

Optionally, the third message processor may be arranged for determining a third arrival time of the measurement message at the third device, while the support data is also based on the third arrival time. In an embodiment, the first message processor is arranged for obtaining a third distance between the third device and the second device using the support data regarding the third arrival time, and performing the verification test also using the third distance. Advantageously, by also determining the third distance in addition to said first and third angles, and using the third distance in the verification test, it is more difficult for a malicious second device to manipulate the measurements and message data to fake a different position of the second device.

In an embodiment, the device comprises a clock unit to provide a time reference for determining said arrival times, and the first message processor is arranged to synchronize the time reference with a corresponding clock unit in the cooperating device. Advantageously, the time reference is shared between the first and the third device. The third arrival time may be determined relative to the time reference, which enables the support data to comprise the third arrival time so determined, and being usable as such by the first device.

In an embodiment, the ranging protocol comprises the first device, acting as an initiating device, sending an initiating message to the second device, while, upon receiving the initiating message, the second device has to send the measurement message. The first message processor is arranged to exchange role-change data with the third device to enable the third device to act as the initiating device for a distance measurement. The third device is arranged, upon receiving the role-change data, to obtain a third distance between the third device and the second device according to the ranging protocol based on a second measurement message, to determine a third direction when receiving the second measurement message at the third device, and to transfer third support data to the first device, the third support data being indicative of the third direction. The support data may also include the third distance. The first message processor is arranged to determine a second direction when receiving the second measurement message at the first device,
 to receive, from the third device, the third support data, and
 to perform the verification test also using the second direction and the third support data.

Advantageously, by determining said second direction and verifying the first and third distance, and the first and second direction in combination, it is more difficult for the second device to consistently tamper with both distance measurements.

In an embodiment, the third message processor is arranged to determine a third signal strength of at least one message received from the second device, and including third signal strength data in the support data to the first device. The first message processor is arranged to determine a first signal strength of at least one message received from the second device, and to verify whether the determined distances are reliable by comparing the first signal strength and the third signal strength to respective expected signal strengths at the determined distances. Optionally, both the first device and the third device may measure the signal strength of the same message from the second device. Advantageously, a further, independent mechanism is added that enables verification of the determined distances.

In an embodiment, the first message processor is arranged, upon assessing that the determined distance is not reliable, to require executing a different security protocol with the second device. Advantageously, alternatively or additionally, the first message processor is arranged, upon assessing that the determined distance is not reliable, to request a further distance measurement using a different ranging protocol and/or a different type of wireless communication. Alternatively, or additionally, the first message processor is arranged, upon assessing that the determined distance is not reliable, to deny or restrict access to at least some data and/or to at least one function in the first device. Advantageously, malicious access to, or use of, any function or data in the first device is prevented.

According to a further aspect of the invention, a system for reliable distance measurement comprises the device and the third device as described above, and a fourth device acting as a second cooperating device being located at a second trusted distance from the first device and being located at a third trusted distance from the third device, the cooperating device sharing a second connecting direction with the first device. The second connecting direction is indicative of a direction of a line connecting the first device and the second cooperating device. The fourth device comprises a fourth wireless receiver for receiving of messages, the receiver comprising a fourth directional antenna for detecting a direction of a received signal carrying a message, a fourth message processor arranged for determining a fourth direction when receiving the measurement message at the fourth device, and transferring fourth support data to the first device, the fourth support data being indicative of the fourth direction. The first message processor is arranged for
receiving the fourth support data from the second cooperating device,
obtaining a fourth angle between the fourth direction and the second connecting direction based on the fourth support data, and
to perform the verification test also using the second trusted distance and the fourth angle.

Advantageously, by determining said further distance and verifying all distances in combination, it is more difficult for the second device to consistently manipulate said distances.

Optionally, the verification test may use a combination of a triangle inequalities on at least two spatial constellations, each constellation comprising the second device and two devices of the set of the first device and the cooperating devices. Optionally, the first message processor may be arranged to verify whether a first location of the second device according to the first spatial constellation corresponds to a second location of the second device according to the second spatial constellation.

Optionally, the first message processor may be arranged to perform the verification test using an inconsistency check for detecting whether all of the determined distances are larger than zero.

Optionally, the first message processor may be arranged to perform the verification test based on a setup wherein the third device and the fourth device are arranged so that a trusted angle between a line from third device to first device and a line from fourth device to first device is at least 90 degrees.

Optionally, the first message processor may be arranged to perform the verification test based on a setup wherein the third device and the fourth device are arranged opposite to each other with respect to the first device.

Optionally, the first message processor may be arranged to perform the verification test based on a setup wherein the second trusted distance corresponds to the trusted distance.

In an embodiment, the system comprises a fifth device acting as a third cooperating device, the first cooperating device having a first connecting direction, the second cooperating device having a second connecting direction, and the third cooperating device having a third connecting direction, each connecting direction being indicative of a direction of a line connecting the first device and the respective cooperating device and each connecting direction having an angle of approximately 90 degrees with the other connecting directions. The first message processor is arranged to perform the verification test using a combination of a triangle inequalities on at least two spatial constellations, each constellation comprising the second device and two devices of the set of the first device and the cooperating devices. Advantageously, by determining said further distance and verifying all distances in combination, it is more difficult for the second device to consistently manipulate said distances.

In an embodiment, the method comprises instructing the first device to act as an initiating device to provide the first angle, or to provide the first arrival time or the first distance. Alternatively, or additionally, the method comprises instructing the third device to act as the cooperating device to provide the support data being based on the third direction. Effectively, control of the distance measurement is now performed by said instructing.

It is noted that in the above, for clarity reasons, it has been described as the first device performing the distance measurement and distance reliability verification. However, it is also possible that the first device, the third device and/or further cooperating devices provide all required information to a control device which performs the distance measurement and distance reliability verification.

A method according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. The computer program product may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is provided a computer program product downloadable from a network and/or stored on a computer-readable medium and/or microprocessor-executable medium, the product comprising program code instructions for implementing a method as described above when executed on a computer.

Another aspect of the invention provides a method of making the computer program available for downloading, for example included in a location based application. This aspect is used when the computer program is uploaded into, e.g., APPLE'S APP STORE, GOOGLE'S PLAY STORE, or MICROSOFT'S WINDOWS STORE, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
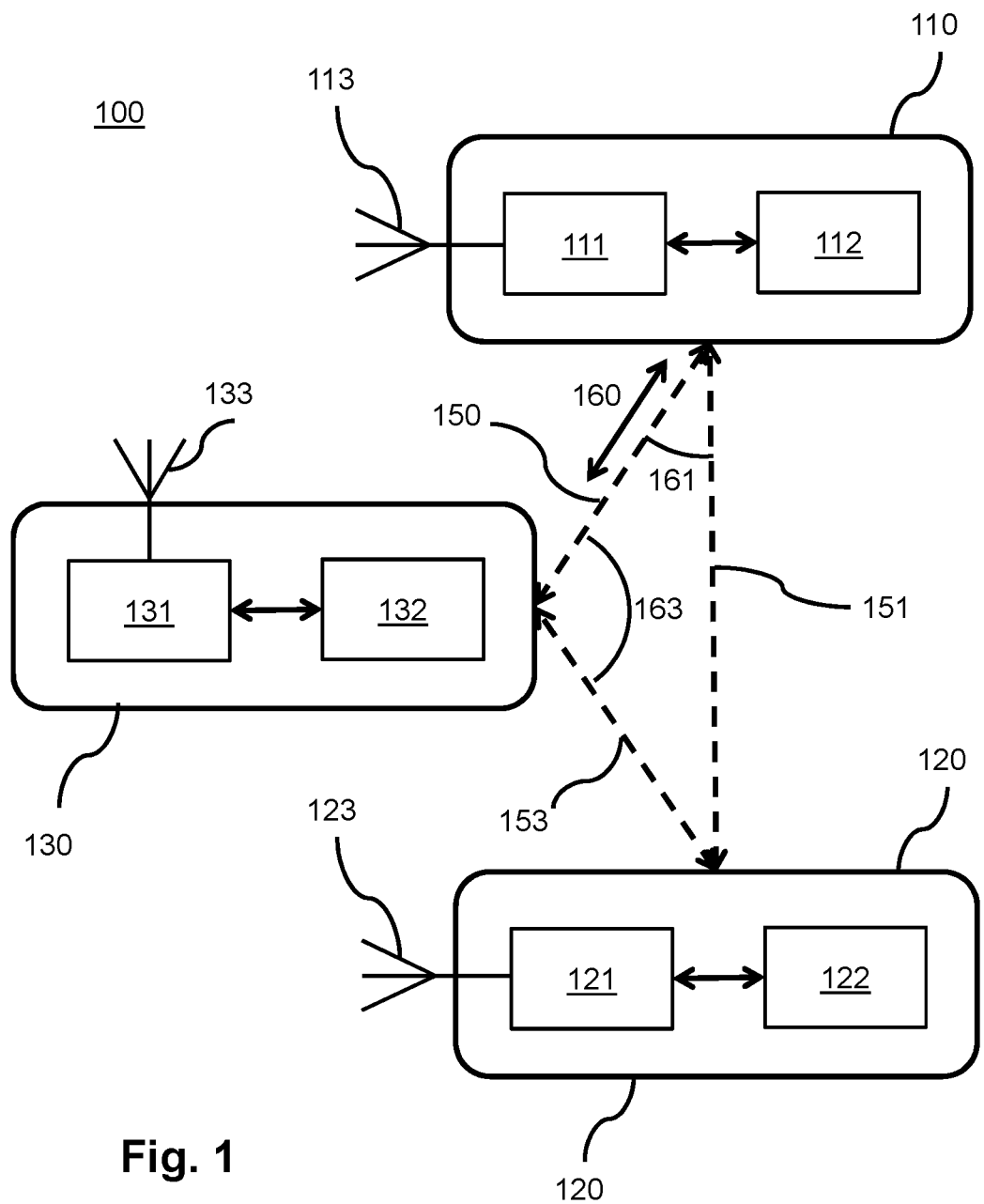
FIG. 1 shows devices for wireless communication and distance measurement.

The distance measurement methods and devices using wireless communication as described below provide at least a basic function, i.e. providing information on the current distance between a mobile device to another device, e.g. on a fixed position. Various protocols are below described as examples of suitable ranging protocols using arrival times of measurement messages, which may be enhanced using the embodiments described thereafter.

Also, in addition to distance measurements, direction measurements may be performed to determine where a responding device is located. The system described requires one or more co-operating devices that each are able to measure the direction of an incoming RF signal intended for the distance measuring device. For example, a directional antenna or multiple receive antennas may be used for direction measurement. In this documents, any arrangement of direction sensitive antenna elements is called a directional antenna.

Single antennas of around up to a wavelength in size do not exhibit much directivity. However, when combining several antennas and delaying the signals from the individual antenna such that they constructively add up when the received RF waves come from a certain direction, a much better directivity can be obtained. By changing the individual delays, the direction of highest sensitivity can be changed. The more antennas used, the higher the directional sensitivity. As such, directional antennas are well-known and used for example in phased-array radars. How to estimate an angle of arrival using multiple antennas is well-known, see e.g. [AAE]. Single antennas much larger than the wavelength in size do exhibit much directivity. An example of such an antenna is a parabolic antenna used for satellite reception or for microwave radio links.

The use of multiple antennas in wireless communication is described in [802.11], for example in 802.11n, 802.11ac, 802.11ax, 802.11ad, etc. While in 802.11n, 802.11 ac, 802.11 ax up to four antennas are supported and the multiple antennas are primarily used for creating multiple spatial channels, one to two hundred individual antennas are supported for 802.11 ad and they are used for beamforming. This is because of the very high frequency used, 60 GHz, each individual antenna for 802.1 lad is very small (½ λ dipole is 2.5 mm wide), so picks up little RF energy and beamforming with many antennas is therefore necessary in order to achieve a useful range.

Except for being able to do beamforming, it is also required to calibrate the array, such that the direction of the beam with respect to the antenna array is known for each setting of the antenna coefficients used for beamforming. When the direction of a received RF signal must be measured, the antenna coefficients may be tuned for the highest received signal amplitude and the direction of the RF signal is derived from the antenna coefficients set in this way. Therefore, the system for direction measurement described below may, for example, be used with 802.11 ad when the directional measurement capability of the antenna array is calibrated. However, also other Wi-Fi and RF technologies on lower frequencies may be used, when antennas are used for beamforming, instead of creating multiple spatial channels.

In the system described below, a first or initiating device uses one or more cooperating devices that are at a known position with respect to the initiating device. The cooperating devices are able to measure the direction of an incoming RF signal by using a directional antenna and report this direction to the initiating device. The initiating device uses properties from triangles to verify the spatial constellation of the responding device, the cooperating device(s) and the initiating device for detecting manipulated arrival times and/or distance measurements by cheating responding devices.

A first example of distance measurement is described in [802.11]. Clause 11.24.6 specifies the fine timing measurement (FTM) procedure. The FTM mechanism is intended for measuring the difference in absolute time between the clocks in two devices, such that one also can compensate for the time it takes for RF waves to travel from one device to the other with the speed of light. In the FTM procedure, one of the devices sends time stamps of its clock to the other in such a way that the other device can measure the round-trip time (RTT) between the two (explained later). Distance measurement between two devices using 802.11 (Wi-Fi) is done by measuring the round-trip time (RTT) using the fine timing measurement (FTM) procedure specified in clause 11.24.6 of [802.11], multiplying the RTT by the speed of light and dividing by 2.

The following is an explanation of FTM in [802.11], see e.g. FIGS. 11-35, 11-36, 11-37 and surrounding text. The numbering of the time stamps below is from FIG. 11-36. An Initiating STA (station) wants to know the RTT or distance to another STA, the Responding STA. To accomplish this, the Initiating STA sends an Initial FTM Request to the Responding STA. The Responding STA sends an FTM_1(0, 0) message to the Initiating STA and measures the exact time of transmission. The Responding STA stores this time as t1_1. The Initiating STA measures the reception of the FTM_1(0, 0) message as t2_1. It measures the transmission time of the resulting ACK as t3_1. However, the Initiating STA cannot use the values t2_1 and t3_1 just yet.

The Responding STA measures the reception time of the ACK received as the response to FTM_1(0, 0) and stores this as t4_1. After a while (at least Min Delta FTM seconds), the Responding STA transmits FTM_2(t1_1, t4_1) and notes the time of transmission as t1_2. This Initiating STA goes through the same routine as described above, i.e. measuring the reception time of FTM_2(t1_1, t4_1) as t2_2 and the transmission time of the ACK as t3_2. However, this time, the Initiating STA is able to measure an RTT according to the following equation (11-5) from [802.11].

$$RTT=[(t4\_1-t1\_1)-(t3\_1-t2\_1)] \quad (1)$$

Rearranging the right hand side of the formula above yields $$RTT=(t2\_1-t1\_1)+(t4\_1-t3\_1) \quad (2)$$

from which it can easily be seen that (t2_1−t1_1) is the time for the FTM frame to travel over the RF medium from Requesting STA to the Initiating STA while transferring the FTM frame and that (t4_1−t3_1) is the time for the ACK frame to travel over the RF medium from the Initiating STA to the Responding STA, so that their sum is indeed the round-trip time. In order to increase the accuracy, the above can be repeated and the RTT can be computed as the average of all the measurements.

t1_X is a Time Of Departure (TOD). The TOD is defined in [802.11] as "The TOD [ . . . ] represents the time, with respect to a time base, at which the start of the preamble of the last transmitted Fine Timing Measurement frame appeared at the transmit antenna connector." The preamble is the very first part of a PHY frame, which among other things means that a transmitter does not transmit any RF energy just before the preamble. Therefore, the Initiating STA must measure t3_X in the same way, i.e. t3_X represents the time, with respect to a time base, at which the start of the preamble of the last transmitted ACK frame as a response to a received Fine Timing Measurement frame appeared at the transmit antenna connector.

t4_x is a Time Of Arrival. The TOA is defined in [802.11] as "The TOA [ . . . ] represents the time, with respect to a time base, at which the start of the preamble of the Ack frame to the last transmitted Fine Timing Measurement frame arrived at the receive antenna connector." Therefore, the Initiating STA must measure t2_X in the same way, i.e. t2_X represents the time, with respect to a time base, at which the start of the preamble of the last received Fine Timing Measurement frame arrived at the receive antenna connector.

Therefore, the minimum time t3−t2 is equal to the length of the received FTM(,) frame+SIFS and the maximum time t3−t2 is equal to the length of the received FTM(,) frame+ DIFS. The length of FTM(,) frames may vary. In the rest of this document, we use the following definitions:

- use Lftm to denote the length in time of the physical FTM frame that resulted in the Initiating STA to measure t2 and t3;
- use the term reaction time or reaction time of the Initiating STA and the symbol R as the time the Initiating STA takes from just after the last symbol of the physical FTM frame (i.e. the last symbol of the CRC check) arrived at its receive antenna connector to the TOD of the ACK frame it sent in response to the FTM frame. Since sending an ACK frame is a rather simple action it is likely done in hardware and may therefore be constant.

Clause 11.24.5 of [802.11] specifies the timing measurement (TM) procedure. There are some differences from the FTM procedure, the most notable one is the better resolution of the time stamps, which in principle allow for a more precise distance measurement. The embodiments below may be used in the same way for TM as described here for FTM.

A further example of a distance measurement system similar to FTM is described in U.S. Pat. No. 8,762,727B2. The difference is that the Initiator STA is called the source node, the Responder STA is called the target node and that the source node measures t1 and t4 and the target node measures t2 and t3 and sends these to the source node.

Further example of a distance measurement system is described in 3GPP, called OTDOA (Observed Time Difference Of Arrival), see [OTDOA], which is a positioning feature introduced in rel9 E-UTRA (LTE radio), see references [36.nnn] as elucidated below. It is a multilateration method in which the User Equipment (UE) measures the time difference between some specific signals, Positioning Reference Signals—PRSs, from several eNodeBs (say base stations) and reports these time differences to a specific device in the network, the location server (the Evolved Serving Mobile Location Center—E-SMLC). Based on these time differences and knowledge of the eNodeBs locations. The E-SMLC calculates the UEs' position. The description of the LPP (LTE positioning protocol) can be found in the [36.355] specification. The exact details of the PRS signals can be found in section 6.10.4 of [36.211], and a simple OTDOA procedure can be found in the RAN5 OTDOA test cases' descriptions in section 9 of the [37.571-1] specification. Just as the measurements for localization in Wi-Fi, the mobile device can fake these OTDOA reports to appear to the network anywhere it wants. These embodiments below may be used to protect against this type of cheating. Another term for the same measurements to be done in OTDOA by the UE is RSTD (Reference Signal Time Difference). RSTD measurement accuracy requirements are specified in [36.133].

A further example of distance measurement in 3GPP is based on arrival times of messages with reference to a time grid, and is called Enhanced cell ID based or E-CID. Cell ID based methods were already possible before rel9. Enhanced cell ID aggregates together some already available measurements, some of them with increased accuracy requirements to improve the positioning accuracy capabilities. Enhanced Cell ID, E-CellID, or E-CID is a positioning feature introduced in rel9 E-UTRA (LTE radio). The UE reports to the network (through the serving cell or eNodeB to the location server, the Evolved Serving Mobile Location Center—E-SMLC) the serving cell ID, the timing advance (difference between its transmit and receive time) with the serving cell, the reference (narrowband) signal received power (RSRP/NRSRP), the (narrowband) reference signal received quality (RSRQ/RSRQ). The RSRP/NRSRP, and the RSRQ/RSRQ may be measured and reported from any neighboring cell, while the timing advance is only measured for the primary cell (serving cell). The serving cell or eNodeB may report extra information to the ESMLC like the angle of arrival. The ESMLC estimates the UE position based on this information and its knowledge of the cells positions.

Measuring the timing advance is as follows. In LTE or GSM, a cell sends a frequency—time grid of send or receive opportunities with a fixed timing. For LTE, the individual frequencies are the frequencies of the OFDM subcarriers and are usually 15 kHz apart. The time domain consists of successive frames of 10 ms, with each frame consisting of ten subframes and each subframe consisting of two slots of 0.5 ms. This frequency—time grid is maintained with a very strict timing by the cell. Per grid element, the cell can be transmitting to all mobile devices in range (broadcast) or to one particular device. In some of the grid elements (a frequency, subframe combination or sometimes frequency—slot combination), the cell will always be transmitting, as defined in the 3GPP specifications. These grid elements are thus ideally suited for transmitting system information to the mobile devices in the cell, such as the purpose of each of the grid elements that can be used flexibly. In each of the other grid elements, so the elements that can be used more flexibly, the cell may be broadcasting to all mobile devices in range, it may be transmitting to a particular mobile device, or it may have given a particular mobile device permission to transmit to the cell or to another mobile device in the cell.

Because it takes time for the RF waves to travel from the cell to a mobile device (about 300 meter per microsecond), the grid will appear to be delayed to a mobile device by this travel time. Suppose this travel time is t seconds. When the mobile device starts transmitting from exactly the start of the subframe in which it is allowed to transmit, it starts transmitting t seconds later than the start of the subframe at the cell. It takes again t seconds for the signal transmitted by the mobile device to arrive at the cell. Therefore, the cell receives a transmission from the mobile device not starting exactly at the start of the subframe allocated to it, but 2t seconds later. By measuring this delay, the cell can determine the distance to the mobile device.

If a mobile device is far away from the cell, the end of its transmission in a subframe may arrive later than the start of the next subframe, so cause interference. In order to overcome this problem, a cell can ask a mobile device to use a certain amount of timing advance, coded in the so-called TA value in a timing advance command addressed to the particular mobile device. The mobile device then starts its transmission TA earlier than the start of the subframe as determined by the mobile device. The maximum value possible for timing advance is 0.67 ms, corresponding to a mobile device to cell distance of slightly more than 100 km. Technical Specifications 3GPP TS 36.321 [36.321], section 6.1.3.5 "Timing Advance Command MAC Control Element" describes the TA value adjustment procedures for LTE.

A mobile device that wants to appear at a different distance can start its transmission earlier than it is supposed to by the frequency—time grid and the TA value it received from the cell when it wants to appear closer to the cell or start transmitting later than it is supposed to when it wants to appear further away from the cell than it is in reality.

An accurate and correct distance measurement is important in several applications. E.g. when Wi-Fi FTM is used to measure the distance from a car to a key fob by Wi-Fi so the car can decide to open its doors when the measured distance is less than say 5 meters it is important that the actual distance to the key fob is indeed less than 5 meters. Another example may be that a device is only allowed to stream copy-righted content to another device if the other device is not further away than a certain distance. An accurate and correct distance measurement can also be used to prevent man-in-the-middle attacks when setting up a secure authenticated channel. This is explained in the next paragraphs.

When two devices need to secure their wired or wireless communication, they may encrypt their communication. However, this requires that both wireless devices know the same key. Diffie-Hellman [DH] is a well-known technique for establishing a secret key between two parties, where the communication between the parties for establishing the secret key does not reveal any information to third parties on the established secret key. The two parties each use their own public/private key pair and exchange the public key with each other. Each party is able to compute the secret key using its own private key and the other party's public key and possibly some other information, e.g. a nonce (random number) from each party. Each party may generate a key pair anew each time it performs Diffie-Hellman or it reuses an older key pair.

When performing Diffie-Hellman over a network, a device that receives a public key for performing Diffie-Hellman does not know from which device this public key is. This may be exploited by an attacker in a so called man-in-the-middle attack. An attacker E might masquerade as the real device B with which device A wants to connect. The attacker E performs Diffie-Hellman with device A and establishes a secret key Kae with device A. Similarly the attacker masquerades as device A to device B and establishes a secret key Kbe with device B. When a message comes in from one of the devices A or B, the attacker decrypts the message with the one secret key, encrypts it with the other and forwards it to the other device. This way, the devices A and B do not notice anything strange in their communication, except for some extra delay. When they check their communication by sending the same information using another way of communication and comparing the results, they will not notice any tampering with their communication. But the attacker has complete knowledge on what they communicate.

In the Device provisioning protocol [DPP], a first step is to perform DPP bootstrapping, i.e. a procedure to gain trust in the public bootstrapping key of the other device and that it is not the public key of a man-in-the-middle device. One of the bootstrapping methods is to scan a QR-code containing the public bootstrapping key of the other device as display by or printed on the other device. The other device may also scan the QR-code of the first device (mutual authentication). After that, the bootstrapping key(s) are used in the DPP Authentication protocol, where it is checked whether the other device also possesses the private key belonging to the public bootstrapping key. If the public bootstrapping keys in DPP would have been exchanged over Wi-Fi (any form of Wi-Fi, e.g. Neighbor Awareness Networking [NAN]), they cannot be trusted since they may have been sent by any device within RF range. Continuing with DPP the DPP authentication protocol would lead to the establishment of a common shared key Ke, but the device do not know whether they are sharing this key with the intended device or with a man-in-the-middle device. Similarly, when using Opportunistic Wireless Encryption [OWE], public keys are exchanged over Wi-Fi and by using Diffie-Hellman, a common shared key is established for the encryption of the subsequent communications between the two devices.

However, a way to limit the probability of having set up a common shared key with a man-in-the-middle device is that the devices measure the distance to the other device and if it is less than a certain distance, as determined by a rule in the device or by its user, e.g. a couple of meters, they trust the public key received from the other device. The user will know in this case that the device that sent the public key over Wi-Fi, so the intended device or a man-in-the-middle device is less than the distance limit away. The user can then judge whether there are any other devices in this range than the intended one.

Limiting the probability of having set up a common shared key with a man-in-the-middle device using a distance measurement can be done by first exchanging public keys over Wi-Fi and then computing a shared session key, e.g. by OWE or by the DPP Authentication Protocol part of DPP (where DPP bootstrapping is done over Wi-Fi e.g. Wi-Fi Aware) and by subsequently executing the FTM procedure using encrypted FTM_X frames using the shared session key determined by Opportunistic Wireless Encryption [OWE] or DPP or some other method or by at least encrypting the fields containing the t1 and t4 values in the FTM_X frames. If the so measured distance to the Requesting STA is less than x meters, the Initiating STA can trust the received public key and can proceed to communicate further with the other device using the agreed session key. In case of DPP, the further communication would be the DPP Configuration protocol. In case of OWE, it would be an encrypted WAN connection between AP and STA. The Initiating STA could also ask the user whether the user is sure that there is only one Wi-Fi device within the distance measured to the Responding STA and if the user confirms this, the Initiating STA proceeds with using the shared session key.

As explained above, a Responding STA may have a reason to make the Initiating STA believe that it is at another distance than it really is. In particular, the Responding STA can make the Initiating STA believe that it is closer than it really is by decreasing t4_X values and/or increasing t1_x values. This is readily apparent from equation (11-5) from [802.11]

$$RTT=[(t4\_X-t1\_X)-(t3\_X-t2\_X)] \quad (3)$$

The distance between the two devices is $$d=c*RTT/2 \quad (4)$$

where c is the speed of light (about $3*10^8$ m/s). If all measurements have been done and reported accurately, the computed d will correspond to the real distance d within measurement accuracy.

To decrease the distance as measured by the Initiating STA by 1 meter, the Responding STA has to decrease the difference of t4_Z and t1_X from their measured values by about $$delta\_t=2*1 \text{ m}/3*10^8 \text{ m/s}=2*3.33*10^{-9} \text{ s}=6.66 \text{ ns} \quad (5)$$

However, the Responding STA has to be careful not to decrease the difference of t4_X and t1_X too much form their measured values when reporting them to the Initiating STA, because the Initiating STA will then measure a negative RTT. The Initiating STA will measure a round-trip time of 0 when the difference of the reported t4_Z and t1_X equals the reaction time of the Initiating STA, i.e. the difference between t3_X and t2_X. Therefore, it is important for successful cheating that the Responding STA knows the difference in t3_X and t2_X of the Initiating STA.

As explained above, the difference in t3_X and t2_X of the Initiating STA consists of two parts, the length of the FTM PHY frame sent (Lftm) and the reaction time R. The Responding STA has sent the FTM frame itself, so knows its length in time Lftm. The reaction time R may be known to the Responding STA in a variety of ways.

We assume that the cheating device somehow knows the real distance to the Initiating STA and can therefore precisely fake the distance that the Initiating STA will measure, by adapting the reported t1 and t4. So the problem with doing measurements using FTM as described above is that a malicious Responding STA can manipulate its reported arrival times t1 and t4 such that it can appear closer to or further away from the Initiating STA than it actually is.

For preventing successfully faking a distance, an initiating device may involve one or more cooperating devices that are at a known position with respect to the initiating device. The initiating device and the cooperating device(s) employ a directional receive antenna so they are capable of measuring the direction of an incoming RF signal with respect to a coordinate system that is linked to at least the orientation to one another. In this document, such linking is called sharing a connecting direction. The connecting direction is indicative of a direction of a line connecting the initiating device and the cooperating device.

The cooperating devices may employ clocks synchronized with the one in the initiating device, or may share some other time reference. The cooperating device(s) measure the arrival time(s) of the measurement messages independently and report these to the initiating device. The initiating device uses properties from triangles to try and detect manipulated arrival time measurements by a cheating responding device. For 3GPP based systems, the initiating device and the one or more cooperating devices may be embodied by base stations and the responding device is embodied by a user equipment UE.

By making a distance based measurement more trustworthy, it becomes a viable tool for reliable proximity based services. Some example use cases include:

If you connect to a nearby wireless keyboard, nearby wireless storage device, nearby sensor or nearby wireless webcam, you want to be sure that you connect to the correct one, and not to some man-in-the-middle device that wants to monitor, copy or trace what you are doing.

If you meet your friend and want to connect to your friend's mobile phone to exchange some pictures, you want to be sure you connect to your friend's phone and not a man-in-the-middle.

If in a house or shop you want to automatically switch on some devices, open some door or allow a person to connect to some service with his mobile device when in close proximity, then you want to make sure the location of that mobile device is correct and not a bogus device that claims to be close by.

If in a shop you want to initiate a transaction, e.g. when close to the register, then you want to be sure that you are not being subjected to a "phishing" attack, whereby a user may be unaware and connect to a phishing device located further away instead of an official service provided by the shop.

FIG. 1 shows devices for wireless communication and distance measurement. A spatial constellation 100 of devices for wireless communication comprises a first device 110 and a second device 120, the devices being physically apart at a distance 151. The first device has a first transceiver 111 for transmitting and receiving of messages and a first message processor 112. The second device has a wireless receiver 121, or a second transceiver and a second message processor 122. Also, the third device has a third transceiver 131 and a third message processor 132. The devices are equipped for wireless communication via directional antennas 113,123, 133 connected to the transceivers 111,121,131.

The devices are arranged for distance measurement via the wireless communication according to a ranging protocol between the first device and the second device for determining a distance between the first and the second device, as further detailed below. The wireless communication includes a ranging protocol for determining a distance between the first and the second device based on an arrival time of a measurement message at the first device. The protocol may include transmitting a measurement message by the second device. In the examples the wireless communication and ranging protocol are according to [802.11], but other wireless protocols may also be used, such as Bluetooth, where providing an appropriate ranging protocol based on arrival time measurement.

The first message processor 112 is arranged for processing the messages according to the ranging protocol and determining a first arrival time of the measurement message at the first device, and determining a first distance 151 between the first device and the second device based on the first arrival time. In addition, the first message processor is arranged for communicating with the third device 130. The third device acts as a cooperating device, and is located at a trusted distance 150 from the first device. Also, the cooperating device shares a connecting direction 160 with the first device, which connecting direction is indicative of a direction of a line connecting the first device and the cooperating device. Sharing means that both the first and the third device know this connecting direction as a reference direction which may be used to determine angles is a coordinate system that is available for both devices. The trusted distance and the connecting direction may be predetermined, or may be measured separately or may be entered by a user. The trusted distance and connection direction are known to the first device and trusted to be reliable. Optionally, the first message processor is arranged to determine the trusted distance according to the ranging protocol executed with the third device. Preceding the actual measurements to the second device, the trusted distance may be determined using the same, or another, ranging protocol. Also, the first message processor may be arranged to determine the connecting direction 160 using the first directional antenna 113.

A third device cooperates to determine a third direction when receiving said same measurement message at the third device. In the third device, also called a cooperating device, the third message processor 132 is arranged for said determining the third direction, and to transfer support data to the first device, the support data being based on the third direction. For example, the support data may comprise third direction data relative to a reference direction, the connecting direction 160 or an absolute directional grid, or relative to some other direction determined while receiving a further message also received by the first device. Alternatively or additionally the support data may comprise third angle data, the third device being able to determine a third angle 163 between the between the third direction and the connecting direction.

The first message processor is arranged, for assessing the determined distance, to determine a first direction when receiving the measurement message at the first device, and to determine a first angle 161 between the first direction and the connecting direction, and to receive the support data from the cooperating device. Upon receiving the support data, the processor obtains the third angle 163 between the third direction and the connecting direction using the support data. Subsequently, a verification test is performed on the first distance, the trusted distance and the first angle and the third angle. The verification test may accept the first distance as reliable when said distances and angles correspond to a viable spatial constellation of the first device, the second device and the cooperating device. For example, the verification test includes a cosine rule check or a triangle inequality check on the viable spatial constellation as further elucidated below. The check aims to prove whether a real spatial constellation of a triangle may have the respective angles and lengths of the sides according to the determined angles and distances.

The ranging protocol may include exchanging messages that are cryptographically protected based on key data. Optionally, the first message processor is arranged to share the key data with the cooperating device to enable the third message processor to cryptographically process the messages according to the ranging protocol. Encrypting messages between the first and the third device according to a wireless communication protocol, known as such, protects such messages being tampered with by the, potentially malicious, second device.

Optionally, the device may have a clock unit to provide a time reference for determining said arrival times. The first message processor may be arranged to synchronize the time reference with a corresponding clock unit in the cooperating device, e.g. synchronized with the protocol from [802.1AS]. Effectively, a time reference may be shared between the first and the third device. The third arrival time may be determined relative to the time reference, which enables the support data to include the third arrival time so determined, and being usable as such by the first device.

Optionally, the third message processor 132 is arranged for determining a third arrival time of the measurement message at the third device, the support data being also based on the third arrival time. The first message processor 112 is arranged for obtaining a third distance 153 between the third device and the second device using the support data regarding the third arrival time, and performing the verification test also using the third distance. Alternatively or additionally the support data may comprise third distance data. Thereto, the third device may be able to determine third arrival time data or the third distance between the third device and the second device, e.g. by using further received messages and the trusted distance.

In the following, it is described how and to which extent, the addition of one or more Cooperating STAs can help detect that Responding STAs want to appear closer to the Initiating STA than they are in reality. The following assumptions may apply:
  the Responding STA knows how to adjust the measurements it reports to the initiating STA to appear at any distance to Initiating STA;
  the Initiating STA and the Cooperating STA(s) may have their clocks with which they time the arrival and departure times of physical frames synchronized with the 802.1AS protocol [802.1AS], or communicate otherwise such that the Initiating STA knows which measurements of the Corresponding STA(s) to combine with which measurements of its own;
  the Initiating STA and Cooperating STA(s) share information necessary for the Cooperating STA(s) so that the Cooperating STAs can receive, identify and if necessary decrypt the FTM(,) messages from the Responding STA, so the Cooperating STA(s) can detect the direction or angle of arrival of the FTM(,) messages from the Responding STA and report the direction or angle to the Initiating STA, such that the Initiating STA can combine these reported direction or angle with its own measurements on the same messages;
  the FTM measurements may be performed more than once and the measured and reported times t1, t2, t3 and t4 of all STAs may be averaged first before they are used in distance and location computations, such that the measurement accuracy is good enough for reliable results.

Below a good defense is described against a strong attack for STAs that can do timing measurements. In such defense an Initiating STA works together with one or more Cooperating STAs, and applies a triangle inequality as shown and, in case of two or more Cooperating STAs, applies discrepancy checks in computed positions. The detailed examples are given using the FTM protocol of [802.11]. However, it works just as well with range measuring technology using Wi-Fi, Bluetooth or any other wireless (also optical) technology, where one device reports time of arrival, time of departure of protocol messages, or the difference thereof, to another device.

The examples discussed below with reference to FIGS. 2, 3 and 4 focus on measured distances. In addition angles may be determined as discussed above with FIG. 1. In practical embodiments of the verification test both the determined angles and the distances may be verified using the geometrical properties of viable spatial constellations of the participating devices, such as triangles. The examples below are based on triangles and the triangle inequality. Examples with FIGS. 5 and 6 discuss using determined angles in a verification test.

Figure 2:
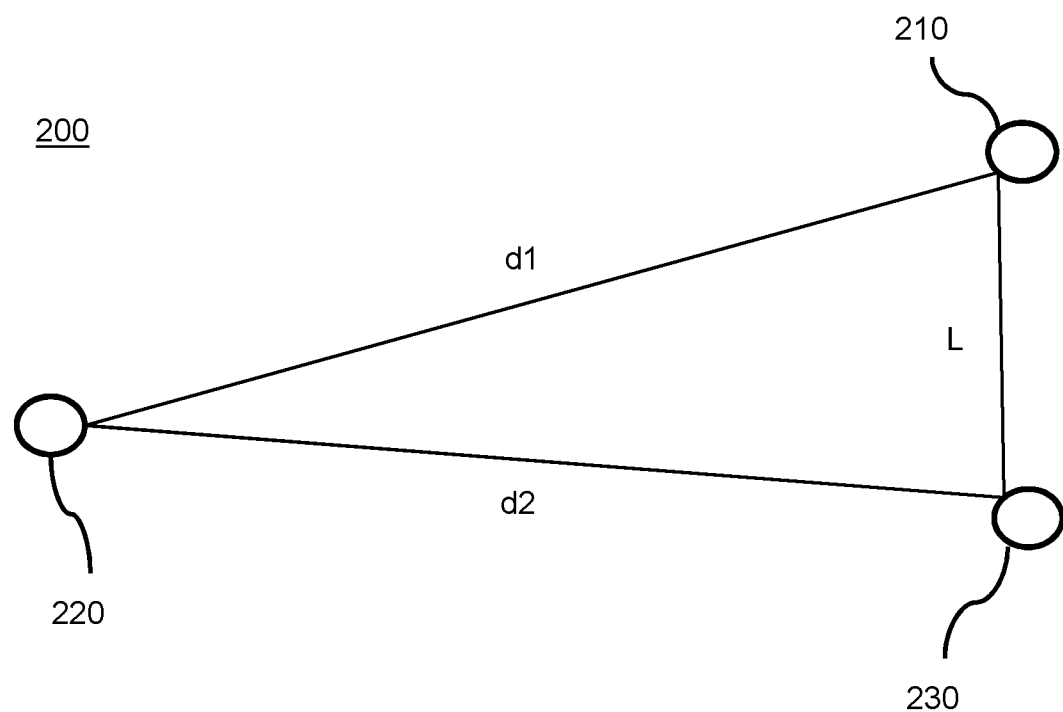
FIG. 2 shows a spatial constellation of a device for wireless communication and a cooperating device

FIG. 2 shows a spatial constellation of a device for wireless communication and a cooperating device. The constellation 200 includes a first device 210, called the initiating STA, a second device 220, called a responding STA, and a third device 230, called a cooperating STA, similar to the devices described with reference to FIG. 1. A first distance d1_c is determined between the first device 210 and the second device 220, which are at a real distance d1 (or d). A third distance d2_c is determined between the third device 230 and the second device 220, which are at a real distance d2. A trusted distance L is between the first device 210 and the third device 230.

In the example, the real distance from the cheating Responding STA to the Initiating STA is d, which is also the distance from the cheating Responding STA to the Cooperating STA. The Initiating STA performs distance measurement to the cheating Responding STA with any of the methods described above. In the remainder, the FTM protocol is assumed.

For each distance measurement, the Initiating STA asks the Cooperating STA what it has measured as the arrival time t2_X of the FTM(t1_X, t4_X) physical frame that the cheating Responding STA has sent. Distances with_c appended are the corresponding distances as computed by a device.

The initiating STA then computes the distance d as usual:

$$RTT = [(t4\_X - t1\_X) - (t3\_X - t2\_X)] \quad (6)$$

The distance between the two devices is $$d1\_c = c*RTT/2 = c*[(t4\_X - t1\_X) - (t3\_X - t2\_X)]/2 \quad (7)$$

where c is the speed of light (about $3*10^8$ m/s). If all measurements have been done and reported accurately, the computed d1_c will correspond to the real distance d within measurement accuracy.

Suppose the cheating Responding STA wants the Initiating STA to think that it is at fake distance f instead of d. The cheating Responding STA has measured t4_X and t1_X. To this end, the Responding STA changes the values of t4_r_X and t1_r_X that it reports such that their difference is $2*(d-f)/c$. less than the difference of the actually measured t4_X and t1_X. Therefore, the times that the cheating Responding STA report to the Initiating STA are $$(t4\_r\_X, t1\_r\_X) = (t4\_X - (1-\alpha)*(2*(d-f)/c), t1\_X + \alpha * (2*(d-f)/c)) \quad (8)$$

where $\alpha$ can be freely chosen.

Using the (t4_r_X, t1_r_X) as reported by the Responding STA, the Initiating STA can compute the distance d1_c between the Responding STA and itself as $$d1\_c = c*RTT/2 = c*[(t4\_X - (1-\alpha)*(2*(d-f)/c) - \\ (t1\_X + \alpha*(2*(d-f)/c))) - (t3\_X - t2\_X)]/2 = \\ c*[(t4\_X - t1\_X) - (t3\_X - t2\_X) - (2*(d-f)/c)]/2 = \\ c*[(t4\_X - t1\_X) - (t3\_X - t2\_X)]/2 - \\ c*(2*(d-f)/c)/2 = d - (d-f) = f \quad (9)$$

This computed distance is indeed what the cheating Responding STA wanted the Initiating STA to compute.

Using the (t4_r_X, t1_r_X) as reported by the Responding STA and the t2c_X obtained from the Cooperating STA, the Initiating STA can compute the distance d2_c between the Responding STA and the Cooperating STA as $$d2\_c = d1\_c + c*(t2c\_X - t2\_X) \quad (10)$$

For any triangle with sides A, B and C, the following inequality must hold (triangle inequality)

$$|C| \leq |A| + |B| \quad (11)$$

Therefore, in the constellation of FIG. 2, the following two inequalities must be true for the real distances as well as for the distances as measured by the Initiating STA $$L \leq d1 + d2 \iff \quad (12)$$

$$L \leq 2*d1 + c*(t2c\_X - t2\_X) \quad (13)$$

The Initiating STA can check whether the above two inequalities hold for the measured distances d1_c and d2_c.

$$L \leq d1\_c + d2\_c \iff \quad (14)$$

$$L \leq d1\_c + d1\_c + c*(t2c\_X - t2\_X) \iff \quad (15)$$

$$L \leq 2*f + c*(t2c\_X - t2\_X) \quad (16)$$

In the constellation of FIG. 2, d1 and d2 are equal, so t2c_X and t2_X are equal. That means that inequality (16) will not hold anymore if the cheating Responding STA chooses f as follows:

$$f < L/2 \quad (17)$$

This means that in the constellation of FIG. 2, the Initiating STA can detect that the Responding STA faked its measurements such that it wants to appear closer than L/2 to the Initiating STA.

Figure 3:
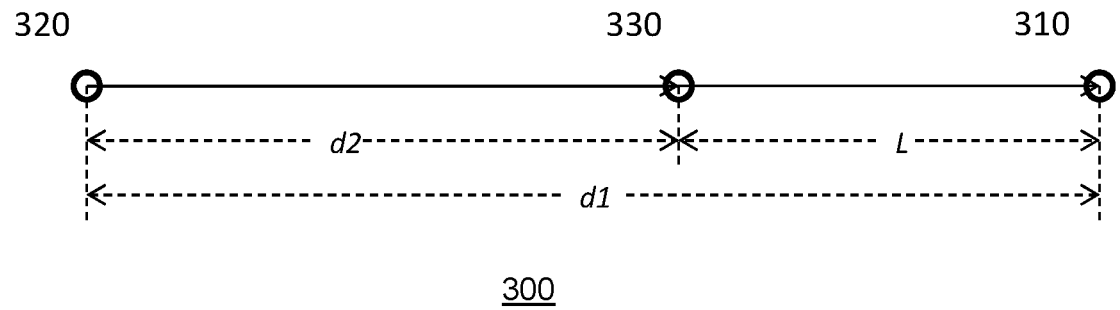
FIG. 3 shows a spatial constellation of two devices for wireless communication.

FIG. 3 shows a spatial constellation of two devices for wireless communication. The constellation 300 includes a first device 310, called the initiating STA, a second device 320, called a responding STA, and a third device 330, called a cooperating STA, similar to the devices described with reference to FIG. 1. A first distance d1_c is determined between the first device 310 and the second device 320, which are at a real distance d1 (or d). A third distance d2_c is determined between the third device 330 and the second device 320, which are at a real distance d2. A trusted distance L is between the first device 310 and the third device 330.

In the example, the Initiating STA will measure f as the distance to the cheating Responding STA and will determine f-L as the distance between the Cooperating STA and the cheating Responding STA.

Inequality (14) will now be $$L \leq d1\_c + d2\_c \iff \quad (18)$$

$$L \leq 2*f - L \iff \quad (19)$$

$$L \leq f \quad (20)$$

which only holds if f is larger than or equal to L. Therefore, the defense proposed does work for the constellation in FIG. 3 and the Initiating STA can detect that the Responding STA faked its measurements such that it wants to appear closer than L to the Initiating STA.

Figure 4:
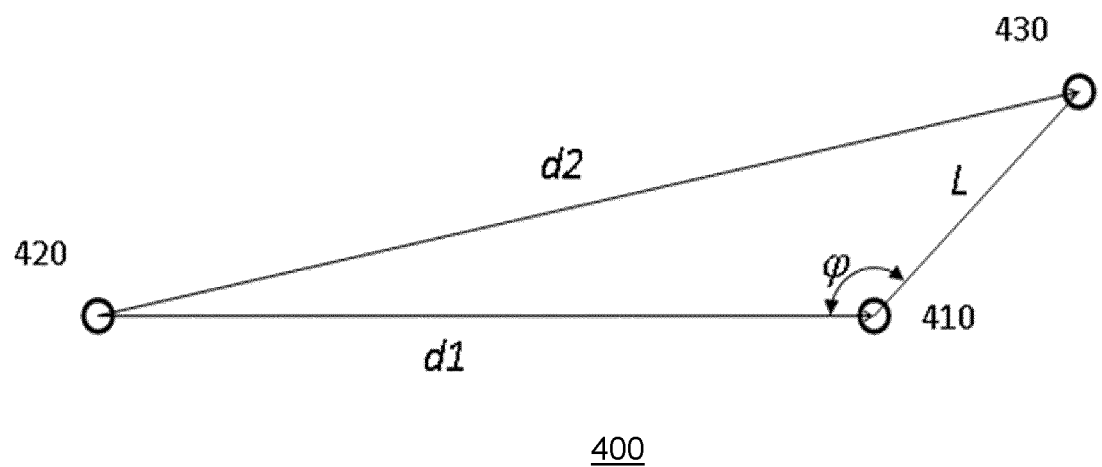
FIG. 4 shows a further spatial constellation of two devices for wireless communication.

FIG. 4 shows a further spatial constellation of two devices for wireless communication. The constellation 400 includes a first device 410, called the initiating STA, a second device 420, called a responding STA, and a third device 430, called a cooperating STA, similar to the devices described with reference to FIG. 1. A first distance d1_c is determined between the first device 410 and the second device 420, which are at a real distance d1 (or d). A third distance d2_c is determined between the third device 430 and the second device 420, which are at a real distance d2. A trusted distance L is between the first device 410 and the third device 430.

In the example, the cosine rule is used. d2 is computed as $$d2^2 = d1^2 + L^2 - 2*d1*L*\cos(\varphi) \qquad (21)$$

Relating d1 and L using α in the following way $$d1 = \alpha * L \qquad (22)$$

we get $$d2 = sqrt((\alpha * L)^2 + L^2 - 2*\alpha*L*L*\cos(\varphi)) = \qquad (23)$$
$$L * sqrt(\alpha^2 + 1 - 2*\alpha*\cos(\varphi))$$

However, the cheating Responding STA changes the information it sends to the initiating STA such that the distances d1_c and d2_c that the Initiating STA will become $$d1\_c = d1 - (d1-f) \qquad (24)$$

$$d2\_c = d2 - (d1-f) \qquad (25)$$

The Initiating STA checks whether inequality (14) holds for the distances it measured $$L \leq d1\_c + d2\_c \Longleftrightarrow \qquad (26)$$

$$L \leq f + L*sqrt(\alpha^2+1-2*\alpha*\cos(\varphi)) - \alpha*L + f \Longleftrightarrow \qquad (27)$$

$$L \leq 2*f + L*\{sqrt(\alpha^2+1-2*\alpha*\cos(\varphi)) - \alpha\} \Longleftrightarrow \qquad (28)$$

$$f \geq 0.5*L*\{1+\alpha-sqrt(\alpha^2+1-2*\alpha*\cos(\varphi))\} \qquad (29)$$

Therefore, the Initiating STA will detect a Responding STA that fakes its reported measurements when the Responding STA chooses f as in the following inequality.

$$f/L < 0.5*\{1+\alpha-sqrt(\alpha^2+1-2*\alpha*\cos(\varphi))\} = T1 \qquad (30)$$

Figure 5:
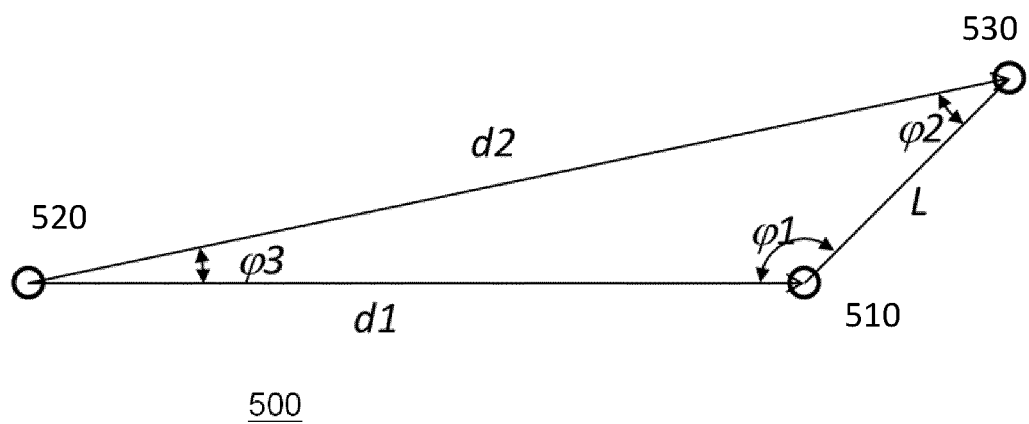
FIG. 5 shows a spatial constellation indicating determined angles.

FIG. 5 shows a spatial constellation indicating determined angles. The constellation 500 includes a first device 510, called the initiating STA, a second device 520, called a responding STA, and a third device 530, called a cooperating STA, similar to the devices described with reference to FIG. 1. A first distance d1_c is determined between the first device 510 and the second device 520, which are at a real distance d1 (or d). A third distance d2_c is determined between the third device 530 and the second device 520, which are at a real distance d2. A trusted distance L is between the first device 510 and the third device 530. A connecting direction is along a line between the first and third device. A first angle φ1 is determined between the connection direction and the direction of receiving the measurement message at the first device from the second device. A second angle φ3 is between the direction of receiving, from the second device, the message at the first device and the direction of receiving the measurement message at the third device. A third angle φ2 is between the connection direction and the direction of receiving the measurement message at the third device from the second device.

The real distance from the Responding STA to the Initiating STA is d. The Initiating STA performs distance measurement to the Responding STA with any of the methods described above. In the remainder, we will assume that it is the FTM protocol. The initiating STA computes the distance d1_c as usual:

$$RTT = [(t4\_X - t1\_X) - (t3\_X - t2\_X)] \qquad (31)$$

The distance between the two devices is $$d1\_c = c*RTT/2 = c*[(t4\_X-t1\_X)-(t3\_X-t2\_X)]/2 \qquad (32)$$

where c is the speed of light (about 3*10^8 m/s). If all measurements have been done and reported accurately, the computed d1_c will correspond to the real distance d within measurement accuracy.

Suppose the cheating Responding STA wants the Initiating STA to think that it is at fake distance f instead of the real distance d. The cheating Responding STA has measured t4_X and t1_X. To this end, the Responding STA changes the values of t4_r_X and t1_r_X that it reports such that their difference is 2*(d-f)/c. less than the difference of the actually measured t4_X and t1_X. Therefore, the times that the cheating Responding STA report to the Initiating STA are $$(t4\_r\_X, t1\_r\_X) = (t4\_X - (1-\alpha)*(2*(d-f)/c), t1\_X + \alpha*(2*(d-f)/c)) \qquad (33)$$

where α can be freely chosen.

Using the (t4_r_X, t1_r_X) as reported by the Responding STA, the Initiating STA can compute the distance d1_c between the Responding STA and itself as $$d1\_c = c*RTT/2 = c*[(t4\_X - (1-\alpha)*(2*(d-f)/c) - \qquad (34)$$
$$(t1\_X + \alpha*(2*(d-f)/c))) - (t3\_X - t2\_X)]/2 =$$
$$c*[(t4\_X - t1\_X) - (t3\_X - t2\_X) - (2*(d-f)/c)]/2 =$$
$$c*[(t4\_X - t1\_X) - (t3\_X - t2\_X)]/2 -$$
$$c*(2*(d-f)/c)/2 = d - (d-f) = f$$

This computed distance is indeed what the cheating Responding STA wanted the Initiating STA to compute.

For each distance measurement, the Initiating STA asks the Cooperating STA what it has measured as the angle of arrival φ2 of the FTM(t1_X, t4_X) physical frame that the cheating Responding STA has sent. Using the angle of arrival φ2 as reported by the Cooperating STA, the angle of arrival φ1 that it measured itself and the law of sines, the Initiating STA can compute the distance d1 between the Responding STA and itself. First, it computes φ3, the angle between the line from the Responding STA to the Initiating STA and the line from the Responding STA to the Cooperating STA.

$$\varphi 3 = 180 - \varphi 1 - \varphi 2 \qquad (35)$$

The law of sines for the constellation in FIG. 5 is the following.

$$L/\sin(\varphi 3) = d2/\sin(\varphi 1) = d1/\sin(\varphi 2) \qquad (36)$$

The Initiating STA then uses the law of sines to computes the distance d1_a to the Responding STA according to the measured angles as $$d1\_a = L*\sin(\varphi 2)/\sin(\varphi 3) \qquad (37)$$

When the distance d1_c computed based on the time of arrival and departure measurements differs too much from the distance d1_a computed based on the measured angles of arrival, the Initiating STA will discard the distances measured.

The timing measurement errors and the angle measurement errors can be decreased by performing the FTM protocol several times and averaging t1_X, t2_X, t3_X, t4_X, al φ1_X2 and φ2_X of each run X before using them in equations (35) to (37). The smaller φ3, the larger the error in d1_a. For best results, φ1 should be in the range [45-135] degrees and |φ3| should be no less than 45 degrees.

Therefore, in order to detect cheating Responding STAs from more directions, two or more Cooperating STAs should be used. For example, with three Cooperating STAs in e.g. the constellation of FIG. 6, all directions can be covered.

In case the Initiating STA finds that the distance d1_c computed based on the time of arrival and departure measurements agrees with the distance d1_a computed based on the measured angles of arrival and so does not discard the distances measured, the Initiating STA can combine d1_c and d1_a in order to increase the accuracy (decrease the error) of the distance measurement between the Initiating STA and the Responding STA. This more accurate, final distance d1_f between the Initiating STA and the Responding STA can be computed according to equation (81), where a weighted average of d1_c and d1_a is calculated, using weight factors c and a. These weight factors can be taken proportional to the accuracy with which d1_c and d1_a are measured, which means that the more accurate a particular measurement is (or the smaller its error), the larger the weight factor should be. If both d1_c and d1_a are measured with the same accuracy, the weight factors c and a can be taken the same, resulting in a normal average.

$$d1\_f = c*d1\_c + *d1\_a/(c+a) \quad (81)$$

Figure 6:
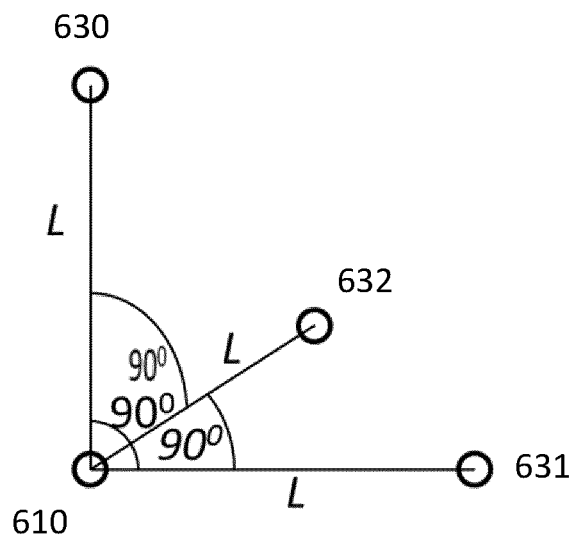
FIG. 6 shows a constellation of an initiating device and three cooperating devices.

FIG. 6 shows a constellation of an initiating device and three cooperating devices. The constellation 600 in a schematic 3-dimensional way shows a first device 610, called the initiating STA and a third device 630, called a first cooperating STA1, a further device 631, called a second cooperating STA2 and another a device 632, called a third cooperating STA3. A responding device is not shown. The devices are similar to the devices described with reference to FIG. 1. In the Figure, the respective trusted distances between the initiating device and the cooperating devices have been made equal as indicated by L, while all angles are 90°, which makes distance and angle calculations less complex. However, in practice the trusted distances and connection directions may be different, while still constituting a viable 3 dimensional arrangement for measurements. The corresponding calculations may be adapted for taking into account the actual respective trusted distances and directions.

A connecting direction is along a line between the initiating device 610 and first cooperating device 630. A second connecting direction is along a line between the initiating device 610 and second cooperating device 631. A third connecting direction is along a line between the initiating device 610 and third cooperating device 632. Angles of 90° are indicated between each connection direction.

The proposed distance measurement system may be used, for example, with Assisted Global Navigation Satellite System (A-GNSS), which is a technique whereby the location server provides assistance data to enable UE based and UE assisted A-GNSS. Locations measured with a GNSS system can be improved using A-GNSS data, e.g. to compensate for systematic errors. A-GNSS may also be used to provide GNSS positioning specific error reasons. The location server can provide assistance data for any type of GNSS (e.g., GPS, Galileo, GLONASS, BDS, etc.). For such localization methods, in which the possibly cheating device measures its position itself and reports the measured position with a message or the possibly cheating device measures other things (e.g. barometric pressure or received signal strength of several base stations, Wi-Fi APs, or Bluetooth beacons, or round trip times to several base stations, Wi-Fi APs, or Bluetooth beacons) that are reported to one of the cooperating devices, the position reported or the position resulting from the reported measurements is compared to the position of the possibly cheating device that can be determined by combining the angle measurements of the cooperating devices. Combining the angle measurements to measure a position can e.g. be done using the constellation of FIG. 6, by, based on the position of each cooperating device in 3-d and the angle it has measured to the possibly cheating device, determining a line for each cooperating device in 3-d on which the possibly cheating device is located. By computing the intersection point of each possible pair of these lines and by e.g. averaging these intersection points, the cooperating devices can measure the position of the possibly cheating device based on the measured angles.

Base stations in 3GPP transmit and receive in a time-frequency grid of so-called Resource Elements. Some of the positions in the time-frequency grid are fixed by a 3GPP standard and are used to broadcast system information to all UEs in range of the base station, e.g. information of when and on which frequencies the base station will send something to a particular UE (downlink) and when and with which frequencies, a particular UE may send something to the base station (uplink) or to a particular other UE (sidelink). When base stations are cooperating according to e.g. the constellation of FIG. 6, their time-frequency grids should be aligned and synchronized and they should each make the same time-frequency positions (Resource Elements) in the grid available so they are all able to measure the receiving angle of the same message from the same UE.

So, the proposed distance measurement system may be extended by using at least one further cooperating device. Further examples are discussed below. In such a system a fourth device, acting as a second cooperating device, is located at a second trusted distance from the first device, the cooperating device sharing a second connecting direction with the first device, the second connecting direction being indicative of a direction of a line connecting the first device and the second cooperating device. The fourth device may have a fourth wireless receiver for receiving of messages, which receiver has a fourth directional antenna for detecting a direction of a received signal carrying a message. The fourth device has a fourth message processor arranged for determining a fourth direction when receiving the measurement message at the fourth device, and for transferring fourth support data to the first device, the fourth support data being indicative of the fourth direction. The first message processor is arranged for receiving the fourth support data from the second cooperating device, obtaining a fourth angle between the fourth direction and the second connecting direction based on the fourth support data. The first message processor is arranged to perform the verification test also using the second trusted distance and the fourth angle.

In an embodiment the verification test uses a combination of a first triangle inequality on a first spatial constellation of the first device, the second device and the third device, and a second triangle inequality on a second spatial constellation of the first device, the second device and the fourth device. The verification test may include the tests discussed in the section on using the triangle inequality and two Cooperating STAs below. Alternatively, the verification test may use the two cooperating STAs as described in a later section on using the triangle inequality and two Cooperating STAs in a better way. For this, the distance between the two cooperating devices may be known by the first device.

In an embodiment, the verification test may verify whether a first location of the second device according to the first spatial constellation corresponds to a second location of the second device according to the second spatial constellation. Optionally, the verification test may use an inconsistency check for detecting whether all of the determined distances are larger than zero.

Also, the verification test may be based on more than the first and second trusted distance, namely the whole constellation of first, third and fourth device. For example, this can be done by using a trusted angle between the connecting lines between the initiating device and both cooperating devices. Optionally, the verification test may be based on a setup wherein the third device and the fourth device are arranged so that a trusted angle between a line from third device to first device and a line from fourth device to first device is at least 90 degrees. Optionally, the verification test may be based on a setup wherein the third device and the fourth device are arranged opposite to each other with respect to the first device. Optionally, the verification test may be based on a setup wherein the second trusted distance corresponds to the trusted distance. Various situations and calculations for the verification test are discussed in the following sections. The following example uses the triangle inequality and two Cooperating STAs.

A further spatial constellation may have two cooperating devices. A first trusted distance L is between the first device and the first cooperating STA, while a second trusted distance L is between the first device and the second cooperating STA. Using the example constellation, a better performance is achieved for $90<\varphi\leq180$, by using a second Cooperating STA, exactly opposite the first one. In that case, the Initiating STA can detect many, although not all cheating Responding STAs that want to appear closer than 0.5*L.

Figure 7:
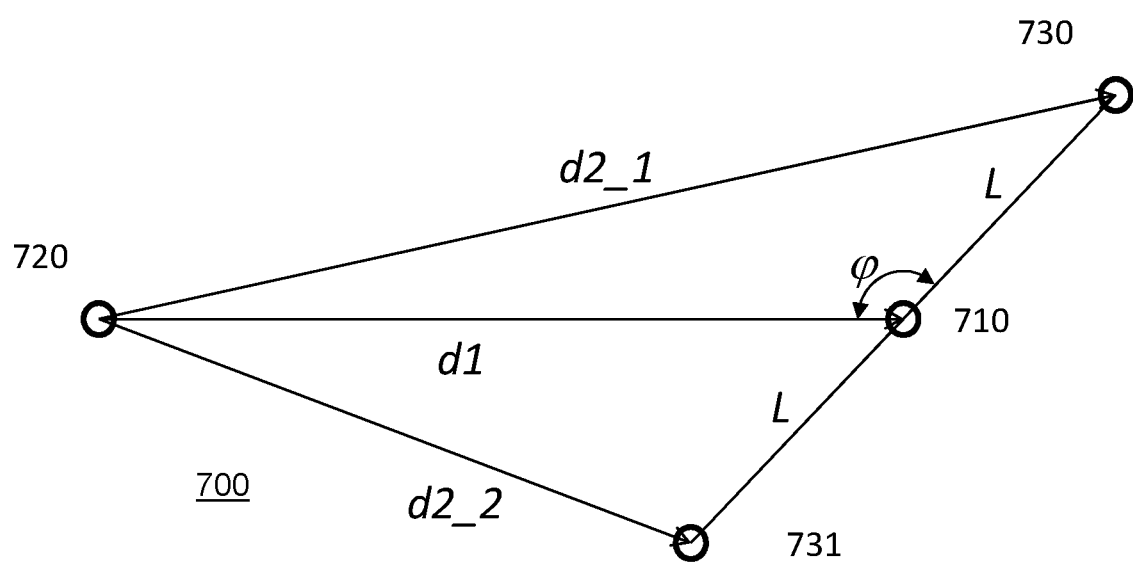
FIG. 7 shows a further spatial constellation having two cooperating devices.

FIG. 7 shows a further spatial constellation having two cooperating devices. The constellation 700 includes a first device 710, called the initiating STA, a second device 720, called responding device, and two cooperating STAs 730, 731, similar to the devices described with reference to FIG. 1. A first trusted distance L is between the first device and the first cooperating STA, while a second trusted distance L is between the first device and the second cooperating STA. Note that in this particular constellation, the second device 720 can be anywhere in 3d on a circle with its center on the line through the first, third and fourth device. Because of this, we compute the location of the second device here only as a 2d coordinate in the plane through the first, second, third and fourth device.

In the example constellation, the triangle inequality and two Cooperating STAs are used. The triangle inequality is used on the measurements via Cooperating STA 1 and 2. Using the cosine rule, we can compute d2_1 as $$d2\_1^2 = L*sqrt(\alpha^2+1-2*\alpha*cos(\varphi)) \qquad (38)$$

and d2_2 as $$d2\_2^2 = L*sqrt(\alpha^2+1-2*\alpha*cos(180-\varphi)) = L*sqrt(\alpha^2+1+2*\alpha*cos(\varphi)) \qquad (39)$$

The cheating Responding STA changes the information it sends to the initiating STA such that the distances d1_c, d2_1_c and d2_2_c that the Initiating STA will become $$d1\_c = d1 - (d1-f) \qquad (40)$$

$$d2\_1\_c = d2\_1 - (d1-f) \qquad (41)$$

$$d2\_2\_c = d2\_2 - (d1-f) \qquad (42)$$

The Initiating STA checks whether inequality (14) holds for the distances it received from Cooperating STA 1 and 2

$$2*L \leq d2\_1\_c + d2\_2\_c \Leftrightarrow \qquad (43)$$

$$2*L \leq L*sqrt(\alpha^2+1-2*\alpha*cos(\varphi)) + L*sqrt(\alpha^2+1+2*\alpha*cos(\varphi)) - 2*(\alpha*L-f) \Leftrightarrow \qquad (44)$$

$$L \leq f + L*\{sqrt(\alpha^2+1-2*\alpha*cos(\varphi)) + sqrt(\alpha^2+1+2*\alpha*cos(\varphi)) - 2*\alpha\}/2 \Leftrightarrow \qquad (45)$$

$$f \geq 0.5*L*\{2+2*\alpha - sqrt(\alpha^2+1-2*\alpha*cos(\varphi)) - sqrt(\alpha^2+1+2*\alpha*cos(\varphi))\} \Leftrightarrow \qquad (46)$$

Therefore, the Initiating STA will detect a Responding STA that fakes its reported measurements when the Responding STA chooses f as in the following inequality.

$$f/L < 0.5*\{2+2*\alpha - sqrt(\alpha^2+1-2*\alpha*cos(\varphi)) - sqrt(\alpha^2+1+2*\alpha*cos(\varphi))\} = T3 \qquad (47)$$

In the constellation of FIG. 7, it is possible to compute the position (x, y) in the plane through the 4 devices in several ways. If the Responding STA reports its measurements faithfully, these computed positions will coincide, except for measurement errors. But they will not if the Responding STA is faking its measurements, especially when it wants to appear closer than it really is.

Assume the Initiating STA to be at (x, y)=(0, 0), Cooperating STA 1 at (L, 0) and Cooperating STA 2 at (−L, 0). Note that these STAs and the Responding STA are of course located in a 3-d world. The plane (x, y) can be any plane in 3-d in which the line through the Initiating STA and the two Cooperating STAs lies. The computations for the y-coordinate in this section should have yielded two values +/−y. Keeping only the positive solution does not present any problem because the other solution for y is obtained when the plane is rotated by 180 degrees around the line through the Initiating STA and the two Cooperating STAs.

First it is checked whether the distances determined by the Initiating STA are larger than zero, as explained in the section "Relation between cosine rule check and triangle inequality check" below.

$$d1\_c > 0 \qquad (48)$$

$$d2\_1\_c > 0 \qquad (49)$$

$$d2\_2\_c > 0 \qquad (50)$$

We assume a cheating Responding STA if any of the three inequalities above does not hold. If these three inequalities hold, we use the cosine rule $$cos(\angle ACB) = (|A|^2 + |B|^2 - C|^2)/(2*|A|*|B|) \qquad (51)$$

for 4 combinations of edges to compute the position of the Responding STA. We always use the point b as the position of the responding STA.

Using point a=(L, 0) and c=(0, 0), we can measure the Responding STA to be at b1=(x1,y1)

$$cos\_c1 = (d1\_c^2 + L^2 - d2\_1\_c^2)/(2*d1\_c*L) \qquad (52)$$

Using point a=(−L, 0) and c=(0, 0), we can measure the Responding STA to be at b=(x2, y2)

$$cos\_c2 = (d1\_c^2 + L^2 - d2\_2\_c^2)/(2*d1\_c*L) \qquad (53)$$

Using point a=(L, 0) and c=(−L, 0), we can measure the Responding STA to be at b=(x3, y3)

$$\cos\_c3 = (d2\_1\_c^2 + 4L^2 - d2\_2\_c^2)/(2*d2\_1\_c*2L) \tag{54}$$

Using point a=(−L, 0) and c=(L, 0), we can measure the Responding STA to be at b=(x4, y4)

$$\cos\_c4 = (d2\_2\_c^2 + 4L^2 - d2\_1\_c^2)/(2*d2\_2\_c*2L) \tag{55}$$

Then we check whether all 4 of the computed cosines are in the interval [−1, 1]. From the section "Relation between cosine rule check and triangle inequality check" below, we know that we have up to now performed the same test as the triangle inequality tests, so with the check up to now, the above three tables apply.

If the four computed cosines are all in the interval [−1, 1], we compute the four points b1, b2, b3 and b4 for the position of the Responding STA as follows.

$$x1 = \cos c1 * d1\_c \tag{56}$$

$$y1 = \text{sqrt}(1 - \cos\_c1^2) * d1\_c \tag{57}$$

$$x2 = -\cos\_c2 * d1\_c \tag{58}$$

$$y2 = \text{sqrt}(1 - \cos c2^2) * d1\_c \tag{59}$$

$$x3 = L - \cos\_c3 * d2\_1\_c \tag{60}$$

$$y3 = \text{sqrt}(1 - \cos\_c3^2) * d2\_1\_c \tag{61}$$

$$x4 = -L + \cos\_c4 * d2\_2\_c \tag{62}$$

$$y4 = \text{sqrt}(1 - \cos\_c4^2) * d2\_2\_c \tag{63}$$

If the Responding STA faithfully reported its time measurements, these 4 points should be the same except for the influence of timing measurement errors. Note that as also explained elsewhere, measurement errors can be made smaller, by performing the measurements multiple times and averaging the results. However, these 4 points are different from each other when the responding STA fakes its measurements to appear closer than it really is and when the Responding STA is not on the line through Cooperating STA 1 and 2.

We compute the maximum emax of all the distances between the 4 points b1, b2, b3 and b4

$$\text{emax} = \text{MAX}|bi - bj| \text{ for } i \in \{1,2,3,4\} \text{ and } j \in \{1,2,3,4\} \tag{64}$$

Note that it is not necessary to compute b4, since b3 and b4 will be computed as the same point except for numerical errors.

The following section uses the triangle inequality and more than two Cooperating STAs. A better performance may be obtained by placing more than two Cooperating STAs around the Initiating one. For best detection of cheating Responding STAs located in as many positions as possible around the initiating STA, it is best to place the Initiating STA and Cooperating STAs in a plane, when using three Cooperating STAs. That is because if the Initiating STA is not on the plane through the three Cooperating STAs, there will be a volume were the cheating Responding STA is always closer to the Initiating STA than any of the three Cooperating STAs and where therefore the proposed method does not work (see e.g. Table 2).

It is also possible to use two Cooperating STAs and an Initiating STA that are not positioned on one line, but which constellation forms a triangle. Using the distances d1, d2_1, d2_2 and the lengths of the sides of the triangle formed by the two Cooperating STAs and the Initiating STA, the Initiating STA can perform checks using the cosine rule on triangles formed by the second device and any pair of devices from the set of the two Cooperating STAs and the Initiating STA.

When using four Cooperating STAs, they should ideally be placed on the corners of a regular tetrahedron and the Initiating STA is located at the centroid of the regular tetrahedron. This constellation is the most symmetric possible one and offers therefore the best protection.

The vertices for a regular tetrahedron with its 4 points on the unit sphere, centroid at the origin and with a horizontal, and lower face level are $$A = (\text{sqrt}(8/9), 0, -1/3)$$

$$B = (-\text{sqrt}(2/9), \text{sqrt}(2/3), -1/3)$$

$$C = (-\text{sqrt}(2/9), -\text{sqrt}(2/3), -1/3)$$

$$D = (0, 0, 1)$$

Therefore, the Cooperating STAs are located at the position of the vertices and the Initiating STA is located at the origin and the distance L is equal to 1 in this case. The largest distance in between any two STAs is the distance between any two Cooperating STAs, so the length of each of the edges of the regular tetrahedron which is $$\|A - D\| = \|(sqrt(8/9), 0, -1/3) - (0, 0, 1)\| = \tag{65}$$
$$\|(sqrt(8/9), 0, -43)\| = sqrt(8/3) \approx 1.63$$

The largest angle between any Cooperating STA, the origin and a responding STA is when the Responding STAA is at a line through the origin and the centroid of any of the four faces of the regular tetrahedron. The centroid of the face ABD is $$F = \tag{66}$$
$$\{(sqrt(8/9), 0, -1/3) + (-sqrt(2/9), sqrt(2/3), -1/3) + (0, 0, 1)\}/$$
$$3 = (sqrt(8/9) - sqrt(2/9), sqrt(2/3), 1/3)/3$$

The angles ∠AOF, ∠BOF and ∠DOF are all the same. This angle can be computed using the cosine rule $$\cos(\angle DOF) = (\|D\|^2 + \|F\|^2 - \|D - F\|^2)/(2 * \|D\| * \|F\|) \tag{67}$$

$$\|D\|^2 = 1 \tag{68}$$

$$\|F\|^2 = \{(sqrt(8/9) - sqrt(2/9))^2 + 2/3 + 1/9\}/9 = \tag{69}$$
$$\{8/9 + 2/9 - 2 * sqrt(16/81) + 7/9\}/9 = 1/9$$

$$\|D - F\|^2 = \{(sqrt(8/9) - sqrt(2/9))^2 + 2/3\}/9 + (8/9)^2 = \tag{70}$$
$$\{8/9 + 2/9 - 2 * sqrt(16/81) + 2/3\}/9 + 64/81 =$$
$$\{2/9 + 6/9\}/9 + 64/81 = 72/81 = 8/9$$

Therefore $$\cos(\angle DOF) = (1 + 1/9 - 8/9)/(2 * 1 * 1/3) = 3 * (2/9)/2 = 1/3 \tag{71}$$

$$\angle DOF) = \arccos(1/3) = 70.53 \text{ degrees} \tag{72}$$

Therefore, with a constellation of one Initiating STA located at the centroid of a regular tetrahedron and four Cooperating STAs located at the vertices of that tetrahedron at a distance L from the Initiating STA, all Responding STAs that want to fake that they are closer than 0.5 L to the Initiating STA can be detected if they are further away than 1.5 L from the Initiating STA, see Table 1. Many such STAs in the area between 0.5 L and 1.5 L can be detected.

Optionally, the defense may be improved by adding inconsistency checks in computed positions using the Initiating STA and the Cooperating STAs similar to defense explained in the previous section.

In an embodiment, the ranging protocol may include the first device, acting as an initiating device, sending an initiating message to the second device, while, upon receiving the initiating message, the second device has to send the measurement message. The first message processor is arranged to exchange role-change data with the third device to enable the third device to act as the initiating device for a distance measurement. Thereto, the third device is arranged to obtain a third distance between the third device and the second device according to the ranging protocol based on a second measurement message, and to determine a third direction when receiving the second measurement message at the third device. Also the third device will transfer third support data to the first device, the third support data being indicative of the third distance and the third direction. For example, the third support data may contain the third direction or the third angle. Also, the support data may contain t2 and t3 values of the FTM protocol that the third device has measured. The t1 and t4 values may also be part of it, but this is not necessary, since the first device may receive and use the original message from the second device containing t1 and t4.

Also, the first message processor is arranged to determine a second direction when receiving the second measurement message at the first device, to receive, from the third device, the third support data, and to perform the verification test also using the second direction and the third support data. In the embodiment, an Initiating STA and a Cooperating STA swap roles—or differently worded-compute position twice using two Initiating STAs.

In the constellation of FIG. 4, we now have two devices 410, 430, acting as a first STA 1 and a second STA 2, that work together to determine the distance to the Responding STA. In a series of measurements, STA 1 acts as an Initiating STA and STA 2 as the Cooperating STA and in a second series of measurements, they assume the opposite roles. The individual time measurements in each series are averaged before a distance is computed in order to improve the distance measurement result. All individual measurements of the first series may be done before the roles are swapped and the individual measurements of the second series are performed. But the role swapping may also be done after any number of individual measurements.

Using the timing measurements from the first series of measurements, so with STA 1 being the Initiating STA, we can use equations (56) and (57) to compute the position r1=(x1, y1) of the Responding STA. Using the timing measurements from the second series of measurements, so with STA 2 being the Initiating STA, we can use similar equations to compute the position r2=(x2, y2) of the Responding STA. Note that in this particular constellation, the second device 420 can be anywhere in 3d on a circle with its center on the line through the first and third device. Because of this, we compute the location of the second device here only as a 2d coordinate in the plane through the first, second and third device.

The computed points r1 and r2 should be equal, except for measurement errors, if the Responding STA faithfully reports it timing measurements. But this may be different when the Responding STA wants to appear closer than it actually is.

In the previous sections, a cheating Responding STA tried to appear at distance f from the Initiating STA. Suppose the Responding STA does not know that the two STAs swap roles every now and then and tries to appear at fake distance f from each of them. In this case, r1 and r2 will clearly be different, especially if f<0.5 L.

Therefore, using two or more STAs that each serve as Initiating STA and computing the location of the Responding STA using the distances measured by each of the Initiating STAs and judging the difference in computed locations is a good idea to detect Responding STAs that fake their timing measurements.

However, the attack described above is not the best possible attack in this situation. A better attack is when the Responding STA knows with which Initiating STA It is performing the FTM protocol and that it knows the parameters of the constellation (so L and φ or d1 and d2). This may be difficult to get to know in practice, but it is not impossible. It is good security practice to assume that an attacker knows everything, except secret cryptographic keys. Therefore, the defense as described in the previous sections is preferably used.

The following section discusses the relation between cosine rule check and triangle inequality check. Checking whether the triangle inequalities holds for three lengths |A|, |B| and |C|

$$|C| \leq |A|+|B| \tag{73}$$

$$|A| \leq |B|+|C| \tag{74}$$

$$|B| \leq |A|+|C| \tag{75}$$

is the same as checking whether $$-1 \leq \cos(\angle ACB) \leq 1 \tag{76}$$

The cosine rule for angle ∠ACB is $$\cos(\angle ACB)=(|A|^2+|B|^2-|C|^2)/(2*|A|*|B|) \tag{77}$$

Checking whether the cosine is not less than −1 yields $$\cos(\angle ACB) \geq -1 \Leftrightarrow (|A|^2+|B|^2-|C|^2)/(2*|A|*|B|) \geq -1 \tag{78}$$

We can derive the following inequality from inequality (78) only if $|A|*|B|>0$ $$(|A|^2+|B|^2-|C|^2) \geq -2*|A|*|B| \Leftrightarrow$$

$$(|A|^2+|B|^2+2*|A|*|B|-|C|^2) \geq 0 \Leftrightarrow$$

$$(|A|+|B|)^2-|C|^2 \geq 0 \Leftrightarrow$$

$$(|A|+|B|)^2 \geq |C|^2 \Rightarrow$$

$$|C| \leq (|A|+|B|) \tag{79}$$

which is the same as inequality (73).

Similarly, checking whether the cosine is not more than 1 yields $$\cos(\angle ACB) \leq 1 \Leftrightarrow$$

$$(|A|-|B|)^2-|C|^2 \leq 0 \Leftrightarrow$$

$$(|A|-|B|)^2 \leq |C|^2 \Leftrightarrow$$

$$\text{abs}(|A|-|B|) \leq |C| \Leftrightarrow$$

$$|A| \leq (|B|+|C|) \& |B| \leq (|A|+|C|) \tag{80}$$

which two inequalities must also hold for a triangle.

Note that real distances are always larger than or equal to 0. The reasoning above holds for positive distances, but not for negative distances. The distances obtained by the Initiating STA may be negative when a Responding STA fakes its measurements to become more closely. Therefore, checking on the three triangle inequalities is equivalent to checking whether the three distances measured are greater than or equal to 0 and checking whether the cosine inequality (76) holds.

In an embodiment, the third message processor is arranged to determine a third signal strength of at least one message received from the second device, and to include third signal strength data in the support data to the first device. The first message processor is arranged to determine a first signal strength of at least one message received from the second device, and to verify whether the determined distances are reliable by comparing the first signal strength and the third signal strength to respective expected signal strengths at the determined distances. In the embodiment, distance measurement based on signal strengths is additionally performed to increase the reliability. In addition to arrival and transmit times, also received signal strength can be used as a measurement of distance. A device includes the transmit power with which a message is sent to another device in that message, the other device measures the received signal strength and the other device can determine the distance based on assumed transmitter antenna properties (e.g. that it is omni-directional) and that the signal strength decreases with a power of 2 with the distance. When at least one cooperating device measures the signal strength of that same message and includes such data in the support data as transferred to the first device, the first device may determine the ratio of the distances from the second device based on the received signal strengths.

In an embodiment, the first device and third device may be embodied by base stations in a 3GPP network, while the second device is embodied by a UE. Base stations in 3GPP transmit and receive in a time-frequency grid of so-called Resource Elements. Some of the positions in the time-frequency grid are fixed by a 3GPP standard and are used to broadcast system information to all UEs in range of the base station, e.g. information of when and on which frequencies the base station will send something to a particular UE (downlink) and when and with which frequencies, a particular UE may send something to the base station (uplink) or to a particular other UE (sidelink). When base stations are cooperating according to this invention, their time-frequency grids should be aligned and synchronized and they should each make the same time-frequency positions (Resource Elements) in the grid available so they are all able to measure the arrival time or received signal strength of the same message from the same UE.

In a further embodiment the ranging protocol comprises an additional attribute or additional message that may for example be added to the ranging protocol as defined in [802.11], containing a credential (e.g. public key) or a hash of a credential or an encrypted credential. Such a message is an example of a message that is cryptographically protected based on key data. The second device may include such credential or hash of a credential or an encrypted credential as part of the message exchange for the ranging protocol. To be symmetric, also the first device may include such credential, hash of a credential or encrypted credential in a further message. The preferred field containing the credential or hash of a credential or an encrypted credential in a message of the ranging protocol is a field of which the signal or at least part of the signal transferring that field is used to measure the transmit or arrival time of the message, so that it is very difficult if not impossible for another device to insert its credential or hash of its credential or its encrypted credential in a message that is used to measure distance between the first and second device. The closer (in time) that the signal carrying the credential or hash of a credential or an encrypted credential is to the signal that is used to measure range, or the more overlap between these signals, the better. This way, the first device can be certain that the credential or hash of a credential or an encrypted credential in a message of the ranging protocol is indeed the one of the second device with which it is executing the range measurement protocol. In one embodiment, the first message processor is arranged to process this credential or hash of a credential or encrypted credential, and verifies if it matches a credential that has previously been used by a device with which it has successfully performed device authentication and established mutual trust, such as by using the Wi-Fi Protected Setup Protocol, Device Provisioning Protocol, Diffie-Hellman key exchange and/or the 4-way WPA2 handshake. If a match is found, the first device may assume that the distance measurements between the first and second device can be trusted and deemed reliable. If no match is found, the first device will distrust the distance measurements between the first and second device and perform additional steps to verify the reliability of the distance measurements, such as using the mechanisms as described in other embodiments. In another embodiment, the measured values (e.g. the first time data and/or second time data) are encrypted using a key that was agreed or is derived from agreed credentials between the first and second device as established during an earlier device authentication procedure performed between the first and second device.

In an alternative embodiment, the second device may include a credential or hash of credential or an encrypted credential that will be used during later connection setup. The first message processor is arranged to process and store the received credential or hash of credential or an encrypted credential in conjunction with the measured distance between the first device and the second device, in order to securely correlate the measured distances with the particular device that connects with that credential. Upon setting up the connection between the first and second device, the first device verifies if the same credential or a derivative thereof is used whilst performing the device authentication, such as during performing the Wi-Fi Protected Setup Protocol, Device Provisioning Protocol, Diffie-Hellman key exchange and/or whilst performing the 4-way WPA2 handshake. By doing so, the first device can determine that the device with which it is connecting, is the same device as for which a particular distance measurement was done. In particular, if the credential was a public key and if the setting up the connection between the first and second device included that the second device has successfully proved to device 1 that it has possession of the private key belonging to the public key as credential in the range measurement, the first device can be certain that the second device is the one that it measured the range to and not an imposter.

In an embodiment, the first message processor is arranged, upon assessing that the determined distance is not reliable, to proceed to a different process or function, a deny access to data or a function, instead of the intended process. For example, the normal distance based process may be to grant access to a location based service or local peripheral. Also, routing to or from the first device over another network, e.g. ethernet, the Internet, a 3GPP core network, may be controlled or denied based on the distance measurement. If the determined distance is deemed unreliable, all further communication and/or access may be refused, and/or a warning message may be sent to a management system or guard keeper. Also the first message processor may be arranged, before progressing to any normal distance based process, to engage a different security protocol with the second device may be executed, such as requesting additional credentials and/or a personal identification of the user. The different security protocol may be an additional process or a further enhanced execution of the main protocol, and may e.g. result in a more stringent or severe step in the normal security process. Optionally, the first message processor is arranged to request a further distance measurement using a different ranging protocol and/or a different type of wireless communication, for example NFC at a very close distance or by the human operator of the second device to provide some identification and/or biometrical data like a fingerprint. Also the first message processor may be arranged, before progressing to any normal distance based process, to deny or restrict access to at least some data and/or to at least one application in the first device. For example a basic service may be provided even if the distance is deemed unreliable, while an extended service is provided if the distance is deemed reliable.

Figure 8:
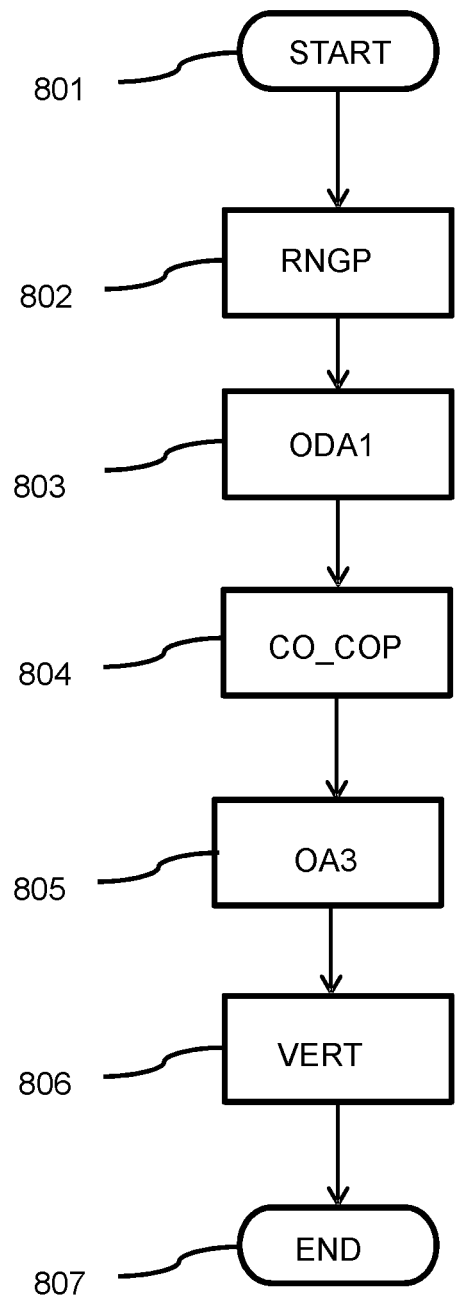
FIG. 8 shows a method for distance measurement.

FIG. 8 shows a method for distance measurement via wireless communication between a first device and a second device. The wireless communication includes a ranging protocol as described above. The first device and the second device are similar to the first and second device as shown and further described with reference to FIG. 1. A third device is acting as a cooperating device being located at a trusted distance from the first device, while sharing a connecting direction. The method may be executed by a processor in the first device, but may also be processed by a processor in a different device and/or at a different time based on the received arrival times and support data. For example, the method may be executed at a further device that is not actively participating in the ranging protocol, but receives all messages and is aware of the trusted distance.

The method starts at node START 801. In a first stage RNGP 802 the method may execute the ranging protocol and perform the arrival time measurements as described with reference to FIG. 1. The method continues with stage ODA1 803 to obtain distance and angle data at the first device. A first distance is determined between the first device and the second device based on a first arrival time of the measurement message at the first device. Also, a first direction is determined when receiving the measurement message at the first device, and a first angle between the first direction and the connecting direction. Subsequently, the method continues by communicating with the cooperating device in stage CO_COP 804. The cooperating device has a third directional antenna for detecting a direction of a received signal carrying a message, and is arranged for determining a third direction when receiving the measurement message at the cooperating device, and for providing support data, the support data being indicative of the third direction and optionally indicative of the third arrival time of the measurement message at the cooperating device. Then, upon receiving the support data, the method continues with assessing the determined distance. In a next stage OA3 805 a third angle is obtained between the third direction and the connecting direction based on the support data. Also, a third distance may be obtained between the third device and the second device using the support data, e.g. calculated based on the third arrival time and the transmission time of the measurement message. Finally, in stage VERT 806, a verification test is performed on the first distance, the trusted distance, the first angle and the third angle and optionally the third distance. The verification test accepts the first distance as reliable when said distances and angles correspond to a viable spatial constellation of the first device, the second device and the cooperating device. The test may be based on the triangle inequalities and inconsistency checks as elucidated above.

In an embodiment, the method may include a preparatory stage, in which the first device is instructed to act as an initiating device to provide the first arrival time or the first distance. Similarly, the third device may be instructed to act as the cooperating device to provide the support data being based on the third arrival time. The preparatory stage may be executed by a separate control device, a computer or server. Alternatively, the first device or the third device may execute said instructing.

Figure 9:
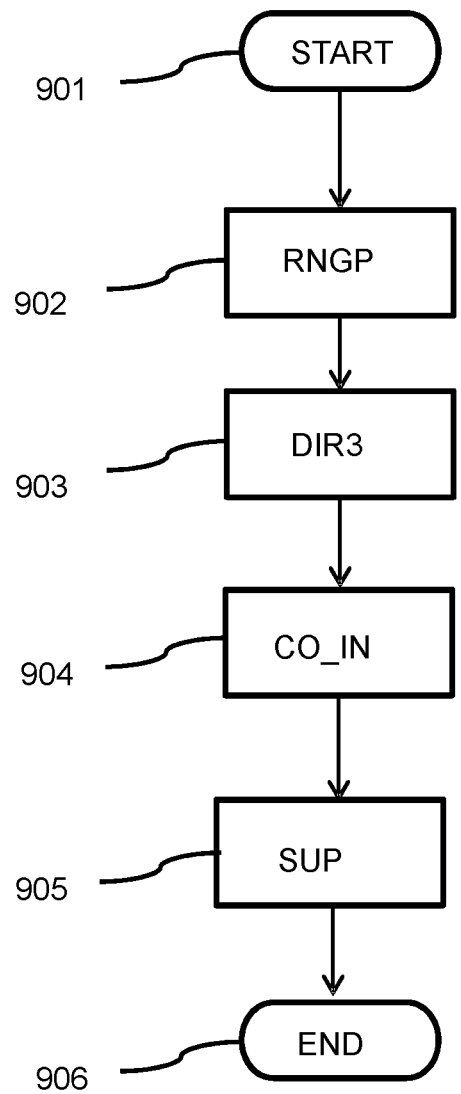
FIG. 9 shows a method for acting as a cooperating device in a distance measurement.

FIG. 9 shows a method for acting as a cooperating device in a distance measurement via wireless communication between a first device and a second device as described with FIG. 8 above. The cooperating device may be located at a trusted distance from the first device. The cooperating device shares a connecting direction with the first device, the connecting direction being indicative of a direction of a line connecting the first device and the cooperating device. The cooperating device has a third directional antenna for detecting a direction of a received signal carrying a message.

The method starts at node START 901. In a first stage RNGP 902 the method may monitor the ranging protocol as performed by the first and the second device. The method continues with stage DIR3 903 by determining a third direction when receiving the measurement message at the third device. Subsequently, in stage CO_IN 904, the cooperating side subsequently communicates with a first device, e.g. using the wireless protocol or using a wired connection. Next, in stage SUP 905, the method provides support data to the first device. The support data is indicative of the third direction and is optionally indicative of the third arrival time of the measurement message at the cooperating device. Then the method at the cooperating side ends at node END 906. As described above, the first device is arranged to obtain said third angle device using the support data, and to perform the verification test on the first distance, the trusted distance, the first angle and the third angle and optionally the third distance.

Figure 10A:
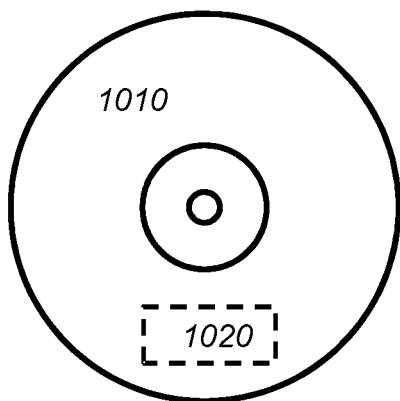
FIG. 10a shows a computer readable medium.

FIG. 10a shows a computer readable medium 1000 having a writable part 1010 comprising a computer program 1020, the computer program 1020 comprising instructions for causing a processor system to perform one or more of the above methods in the system as described with reference to FIG. 9-10. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 10B:
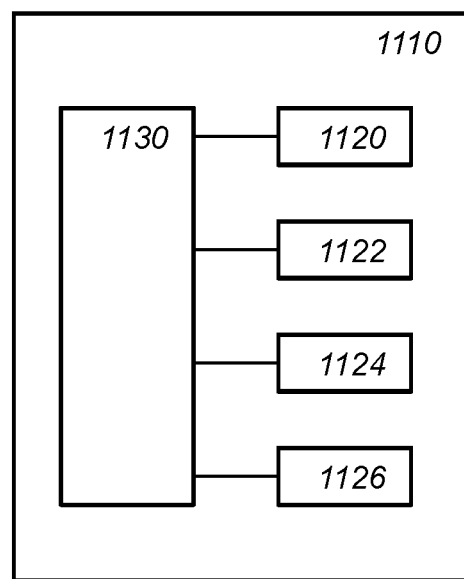
FIG. 10b shows in a schematic representation of a processor system.

FIG. 10b shows in a schematic representation of a processor system 1100 according to an embodiment of the device or server as described with reference to FIG. 9-10. The processor system comprises one or more integrated circuits 1110. The architecture of the one or more integrated circuits 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

Computer program products, downloadable from a network and/or stored on a computer-readable medium and/or microprocessor-executable medium, are provided that comprise program code instructions for implementing the above methods when executed on a computer for protecting location information, as elucidated further below.

Any method according to the invention may be executed using software, which comprises instructions for causing a processor system to perform the respective method. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

REFERENCE DOCUMENTS

[36.133] 3GPP TS 36.133: "Evolved Universal Terrestrial Radio Access (E-UTRA); Requirements for support of radio resource management".

[36.211] 3GPP TS 36.211: "Evolved Universal Terrestrial Radio Access (E-UTRA); Physical Channels and Modulation".

[36.214] 3GPP TS 36.214: "Evolved Universal Terrestrial Radio Access (E-UTRA); Physical layer—Measurements".

[36.321] 3GPP TS 36.321: "3rd Generation Partnership Project; Technical Specification Group Radio Access Network; Evolved Universal Terrestrial Radio Access (E-UTRA); Medium Access Control (MAC) protocol specification".

[36.355] 3GPP TS 36.355: "Evolved Universal Terrestrial Radio Access (E-UTRA); LTE Positioning Protocol (LPP)".

[37.571-1] 3GPP TS 37.571-1: "Universal Terrestrial Radio Access (UTRA) and Evolved UTRA (E-UTRA) and Evolved Packet Core (EPC); User Equipment (UE) conformance specification for UE positioning; Part 1: Conformance test specification"

[802.11] IEEE Computer Society, "IEEE Standard for Information Technology-Telecommunications and Information Exchange Between Systems—Local and Metropolitan Area Networks-Specific requirements Part 11: Wireless LAN Medium Access Control (MAC) and Physical Layer (PHY) Specifications," (IEEE Std. 802.11-2016), December 2016

[802.1AS] Information technology—Telecommunications and information exchange between systems—Local and metropolitan area networks—Part 1AS: Timing and synchronization for time sensitive applications in bridged local area networks, Reference number ISO/IEC/IEEE 8802-1AS:2014(E)

[AAE] Martin Schussel, "Angle of Arrival Estimation using WiFi and Smartphones", 2016 International Conference on Indoor Positioning and Indoor Navigation (IPIN), 4-7 Oct. 2016, Alcali de Henares, Spain; http://www3.uah.es/ipin2O16/usb/app/descargas/223_WIP.pdf

[DH] Diffie, W.; Hellman, M. (1976), "New directions in cryptography", IEEE Transactions on Information Theory, 22 (6): 644-654

[DPP] Device Provisioning Protocol—Technical Specification—Version 1.0, Wi-Fi Alliance, 2018, https://www.wi-fi.org/file-member/device-provisioning-protocol-specification.

[NAN] Neighbor Awareness Networking—Technical Specification—Version 2.0, Wi-Fi Alliance, 2017, https://www.wi-fi.org/file-member/wi-fi-nan-technical-specification.

[OTDOA] Sven Fischer, "Observed Time Difference Of Arrival (OTDOA) Positioning in 3GPP LTE", Qualcomm Technologies, Inc., Jun. 6, 2014.
[OWE] Opportunistic Wireless Encryption—Technical Specification—Version 1.0, Wi-Fi Alliance, 2018, https://www.wi-fi.org/file-member/opportunistic-wireless-encryption-specification.

The invention claimed is:

1. A device for distance measurement via wireless communication between the device acting as a first device and a second device for wireless communication,
the wireless communication comprising a ranging protocol for determining a distance between the first and the second device based on an arrival time of a measurement message at the first device, the ranging protocol comprising transmitting the measurement message by the second device;
the device comprising:
a first transceiver for transmitting and receiving of messages,
a first message processor arranged for:
processing the messages according to the ranging protocol;
determining a first arrival time of the measurement message at the first device, and
determining a first distance between the first device and the second device based on the first arrival time;
wherein the first transceiver comprises a first directional antenna for detecting a direction of a received signal carrying a message, and the first message processor is arranged for:
communicating with a third device, the third device acting as a cooperating device located at a trusted distance from the first device, the cooperating device sharing a connecting direction with the first device, the connecting direction indicative of a direction of a line connecting the first device and the cooperating device;
assessing the determined distance;
determining a first direction when receiving the measurement message at the first device;
determining a first angle between the first direction and the connecting direction;
receiving support data from the cooperating device, the support data containing an indication of a third direction, the third direction determined by the third device upon receipt of the measurement message at the third device;
obtaining a third angle between the third direction and the connecting direction based on the support data,
performing a verification test on the first distance, the trusted distance, the first angle and the third angle, the verification test accepting the first distance as reliable when said distances and angles correspond to a viable spatial constellation of the first device, the second device and the cooperating device;
the third message processor arranged for:
determining a third arrival time of the measurement message at the third device,
the support data also based on the third arrival time; and
wherein the first message processor is arranged for obtaining a third distance between the third device and the second device using the support data regarding the third arrival time, and performing the verification test also using the third distance; and
wherein, when the determined distance is determined to be reliable, the first message processor is arranged to combine a first distance result calculated from arrival times with a first distance result calculated from the trusted distance and first and third angles.

2. The device as claimed in claim 1, wherein the verification test comprises a cosine rule check or a triangle inequality check on the viable spatial constellation.

3. The device as claimed in claim 1, wherein the ranging protocol comprises exchanging messages that are cryptographically protected based on key data, and the first message processor is arranged to share the key data with the cooperating device to enable the third message processor to cryptographically process the messages according to the ranging protocol.

4. The device as claimed in claim 1, wherein the first message processor is arranged to determine the trusted distance according to the ranging protocol, or the first message processor is arranged to determine the connecting direction (160) using the first directional antenna.

5. The device as claimed in claim 1, wherein the device comprises a clock unit to provide a time reference for determining said arrival times, and the first message processor is arranged to synchronize the time reference with a corresponding clock unit in the cooperating device.

6. The device as claimed in claim 1, wherein the ranging protocol comprises the first device, acting as an initiating device, sending an initiating message to the second device, while, upon receiving the initiating message, the second device has to send the measurement message, and the first message processor is arranged:
to exchange role-change data with the third device to enable the third device to act as the initiating device for a distance measurement; the third device arranged, upon receiving the role-change data,
to obtain a third distance between the third device and the second device according to the ranging protocol based on a second measurement message,
to determine a third direction when receiving the second measurement message at the third device, and
to transfer third support data to the first device, the third support data indicative of the third direction;
while the first message processor is arranged:
to determine a second direction when receiving the second measurement message at the first device,
to receive, from the third device, the third support data, and
to perform the verification test also using the second direction and the third support data.

7. The device as claimed in claim 1, wherein the third message processor arranged to:
determine a third signal strength of at least one message received from the second device, and
including third signal strength data in the support data to the first device; wherein the first message processor is arranged to:
determine a first signal strength of at least one message received from the second device, and to verify whether the determined distances are reliable by comparing the first signal strength and the third signal strength to respective expected signal strengths at the determined distances.

8. The device as claimed in claim 1, wherein the first message processor is arranged, upon assessing that the determined distance is not reliable, to at least one of:
require executing a different security protocol with the second device;
request a further distance measurement using a different ranging protocol and/or a different type of wireless communication;
deny or restrict access to at least some data and/or to at least one function in the first device.

9. System for reliable distance measurement comprising the device as claimed in claim 1, the third device and a fourth device acting as a second cooperating device located at a second trusted distance from the first device, the cooperating device sharing a second connecting direction with the first device, the second connecting direction indicative of a direction of a line connecting the first device and the second cooperating device;
the fourth device comprising:
a fourth wireless receiver for receiving of messages, the receiver comprising a fourth directional antenna for detecting a direction of a received signal carrying a message,
a fourth message processor arranged for:
determining a fourth direction when receiving the measurement message at the fourth device, and
transferring fourth support data to the first device, the fourth support data indicative of the fourth direction;
wherein the first message processor is arranged for:
receiving the fourth support data from the second cooperating device,
obtaining a fourth angle between the fourth direction and the second connecting direction based on the fourth support data, and
performing the verification test also using the second trusted distance and the fourth angle.

10. System as defined in claim 9, wherein the first message processor is arranged:
to perform the verification test using a combination of a first triangle inequality on a first spatial constellation of the first device, the second device and the third device, and a second triangle inequality on a second spatial constellation of the first device, the second device and the fourth device; or
to verify whether a first location of the second device according to the first spatial constellation corresponds to a second location of the second device according to the second spatial constellation; or
to perform the verification test using an inconsistency check for detecting whether all of the determined distances are larger than zero; or
to perform the verification test based on a setup wherein the third device and the fourth device are arranged so that a trusted angle between a line from third device to first device and a line from fourth device to first device is at least 90 degrees; or
to perform the verification test based on a setup wherein the third device and the fourth device are arranged opposite to each other with respect to the first device; or
to perform the verification test based on a setup wherein the second trusted distance corresponds to the trusted distance.

11. System as defined in claim 9, the system further comprising a fifth device acting as a third cooperating device, the first cooperating device having a first connecting direction, the second cooperating device having a second connecting direction, and the third cooperating device having a third connecting direction, each connecting direction indicative of a direction of a line connecting the first device and the respective cooperating device and each connecting direction having an angle of 90 degrees with the other connecting directions,
wherein the first message processor is arranged
to perform the verification test using a combination of a triangle inequalities on at least two spatial constellations, each constellation comprising the second device and two devices of the set of the first device and the cooperating devices.

12. Method for distance measurement via wireless communication between a first device and a second device,
the wireless communication comprising a ranging protocol for determining a distance between the first and the second device based on an arrival time of a measurement message at the first device, the protocol comprising transmitting the measurement message by the second device;
the first device comprising a first directional antenna for detecting a direction of a received signal carrying a message;
the method comprising:
obtaining a first distance between the first device and the second device based on a first arrival time of the measurement message at the first device,
communicating with a third device, the third device acting as a cooperating device located at a trusted distance from the first device, the cooperating device sharing a connecting direction with the first device, the connecting direction indicative of a direction of a line connecting the first device and the cooperating device;
the third device comprising a third directional antenna for detecting a direction of a received signal carrying a message, and arranged for:
determining a third direction when receiving the measurement message at the third device, and
providing support data, the support data indicative of the third direction;
the method comprising, for assessing the determined distance,
determining a first direction when receiving the measurement message at the first device,
determining a first angle between the first direction and the connecting direction,
obtaining a third angle between the third direction and the connecting direction based on the support data,
performing a verification test on the first distance, the trusted distance, the first angle and the third angle, the verification test accepting the first distance as reliable when said distances and angles correspond to a viable spatial constellation of the first device, the second device and the cooperating device.

13. Method as claimed in claim 12, wherein the method comprises:
instructing the first device to act as an initiating device to provide the first angle, and the first arrival time or the first distance, or
instructing the third device to act as the cooperating device to provide the support data indicative of the third direction.

14. Method for acting as a cooperating device in a distance measurement via wireless communication between a first device and a second device, the cooperating device located at a trusted distance from the first device, the cooperating device sharing a connecting direction with the first device, the connecting direction indicative of a direction of a line connecting the first device and the cooperating device;

the wireless communication comprising a ranging protocol for determining a distance between the first and the second device based on an arrival time of a measurement message at the first device, the protocol comprising transmitting the measurement message by the second device;

the first device comprising a first directional antenna for detecting a direction of a received signal carrying a message and the first device arranged for obtaining a first distance between the first device and the second device based on a first arrival time of the measurement message at the first device, the third device comprising a third directional antenna for detecting a direction of a received signal carrying a message, the method comprising:

determining a third direction when receiving the measurement message at the third device, and providing support data, the support data indicative of the third direction;

the first device arranged, for assessing the determined distance, determining a first direction when receiving the measurement message at the first device, determining a first angle between the first direction and the connecting direction, obtaining a third angle between the third direction and the connecting direction based on the support data, performing a verification test on the first distance, the trusted distance, the first angle and the third angle, the verification test accepting the first distance as reliable when said distances and angles correspond to a viable spatial constellation of the first device, the second device and the cooperating device.

15. A non-transitory computer-readable medium comprising program code instructions stored thereon which are configured, when executed on a computer, to perform the method of claim 12, wherein a computer program product comprises the computer-readable medium on which the program code instructions are stored, and the computer program product is downloadable from a network.

* * * * *